(12) United States Patent
Omori

(10) Patent No.: US 11,601,562 B2
(45) Date of Patent: Mar. 7, 2023

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Seiya Omori, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/367,136

(22) Filed: Jul. 2, 2021

(65) Prior Publication Data
US 2022/0014639 A1 Jan. 13, 2022

(30) Foreign Application Priority Data

Jul. 13, 2020 (JP) .............................. JP2020-119953

(51) Int. Cl.
*H04N 1/00* (2006.01)
(52) U.S. Cl.
CPC ..... *H04N 1/00517* (2013.01); *H04N 1/00381* (2013.01); *H04N 1/00427* (2013.01); *H04N 1/00437* (2013.01); *H04N 1/00514* (2013.01)
(58) Field of Classification Search
CPC .......... H04N 1/00517; H04N 1/00381; H04N 1/00427; H04N 1/00437; H04N 1/00514
See application file for complete search history.

(56) References Cited

U.S. PATENT DOCUMENTS

| | | | | |
|---|---|---|---|---|
| 2014/0108978 | A1* | 4/2014 | Yu | G06F 3/04817 715/765 |
| 2014/0189551 | A1* | 7/2014 | Kim | G06F 3/0488 715/765 |
| 2014/0300560 | A1* | 10/2014 | An | G06F 3/04886 345/173 |
| 2015/0087275 | A1* | 3/2015 | Brisebois | G06T 3/20 455/414.1 |
| 2021/0072937 | A1* | 3/2021 | Cruz | G06F 3/1257 |
| 2021/0191950 | A1* | 6/2021 | Dewan | G06F 3/0485 |
| 2021/0191989 | A1* | 6/2021 | Dewan | G06F 3/04842 |

FOREIGN PATENT DOCUMENTS

JP 2008236028 A 10/2008

\* cited by examiner

*Primary Examiner* — Justin S Lee
(74) *Attorney, Agent, or Firm* — Canon U.S.A., Inc. IP Division

(57) ABSTRACT

An information processing apparatus includes a display unit configured to display a plurality of display objects for giving an instruction to execute processing on an operation screen, a determination unit configured to determine whether to change a display order of the plurality of display objects based on a state of the information processing apparatus, and a change unit configured to change the display order of the plurality of display objects displayed on the operation screen based on the numbers of uses of the respective display objects in a case where the determination unit determines to change the display order.

13 Claims, 31 Drawing Sheets

FIG.5

| Button ID (b) 501 | Button name 502 | Application to be called 503 | Setting value 504 | |
|---|---|---|---|---|
| B001 | Send to myself | transmission application 423 | to: <<owneraddress>>, two-sided, blancSkip | 511 |
| B002 | One-sided monochrome copy | copy application 421 | 1copies, BW, one-sided | 512 |
| B003 | One-sided color copy | copy application 421 | 1copies, AutoColor, one-sided | 513 |
| B004 | Scan | transmission application 423 | | 514 |
| B005 | Copy | copy application 421 | | 515 |
| B006 | Print all | print application 422 | allprint | 516 |
| B007 | Print | print application 422 | | 517 |
| ... | ... | ... | ... | |

FIG. 11A

| State (s) | Presence or absence of placed document | Presence or absence of unprinted document | Button ID (b) | | | | | |
|---|---|---|---|---|---|---|---|---|
| | | | Send to myself (b = B001) | One-sided monochrome copy (b = B002) | One-sided color copy (b = B003) | Scan (b = B004) | Copy (b = B005) | Print all (b = B006) | Print (b = B007) |
| (s = S00) | 0 | 0 | 7 | 6 | 5 | 4 | 3 | 2 | 1 |
| (s = S01) | 0 | 1 | 5 | 4 | 3 | 2 | 1 | 7 | 6 |
| (s = S10) | 1 | 0 | 7 | 6 | 5 | 4 | 3 | 2 | 1 |
| (s = S11) | 1 | 1 | 5 | 4 | 3 | 2 | 1 | 7 | 6 |

FIG. 11B

| State (s) | Presence or absence of placed document | Presence or absence of unprinted document | Button ID (b) | | | | | |
|---|---|---|---|---|---|---|---|---|
| | | | Send to myself (b = B001) | One-sided monochrome copy (b = B002) | One-sided color copy (b = B003) | Scan (b = B004) | Copy (b = B005) | Print all (b = B006) | Print (b = B007) |
| (s = S00) | 0 | 0 | 17 | 36 | 5 | 4 | 263 | 2 | 1 |
| (s = S01) | 0 | 1 | 5 | 14 | 3 | 2 | 31 | 2387 | 1676 |
| (s = S10) | 1 | 0 | 77 | 86 | 15 | 4 | 33 | 2 | 1 |
| (s = S11) | 1 | 1 | 5 | 404 | 3 | 2 | 1 | 27 | 6 |

| State (s) | Presence or absence of placed document | Presence or absence of unprinted document | Button ID (b) | | | | | |
|---|---|---|---|---|---|---|---|---|
| | | | Send to myself (b = B001) | One-sided monochrome copy (b = B002) | One-sided color copy (b = B003) | Scan (b = B004) | Copy (b = B005) | Print all (b = B006) | Print (b = B007) |
| (s = S00) | 0 | 0 | 17 | 36 | 5 | 4 | 263 | 2 | 1 |
| (s = S01) | 0 | 1 | 5 | 14 | 3 | 2 | 31 | 2387 | 1676 |
| (s = S10) | 1 | 0 | 87 | 86 | 15 | 4 | 33 | 2 | 1 |
| (s = S11) | 1 | 1 | 5 | 404 | 3 | 2 | 1 | 27 | 6 |

| State (s) | | | Button ID (b) | | | | | |
|---|---|---|---|---|---|---|---|---|
| | Presence or absence of placed document | Presence or absence of unprinted document | Send to myself (b = B001) | One-sided monochrome copy (b = B002) | One-sided color copy (b = B003) | Scan (b = B004) | Copy (b = B005) | Print all (b = B006) | Print (b = B007) |
| (s = S00) | 0 | 0 | 17 | 36 | 5 | 4 | 263 | 2 | 1 |
| (s = S01) | 0 | 1 | 2475 | 2534 | 3 | 2 | 31 | 2367 | 1676 |
| (s = S10) | 1 | 0 | 87 | 86 | 15 | 4 | 33 | 2 | 1 |
| (s = S11) | 1 | 1 | 5 | 404 | 3 | 2 | 1 | 27 | 6 |

1401

FIG.15
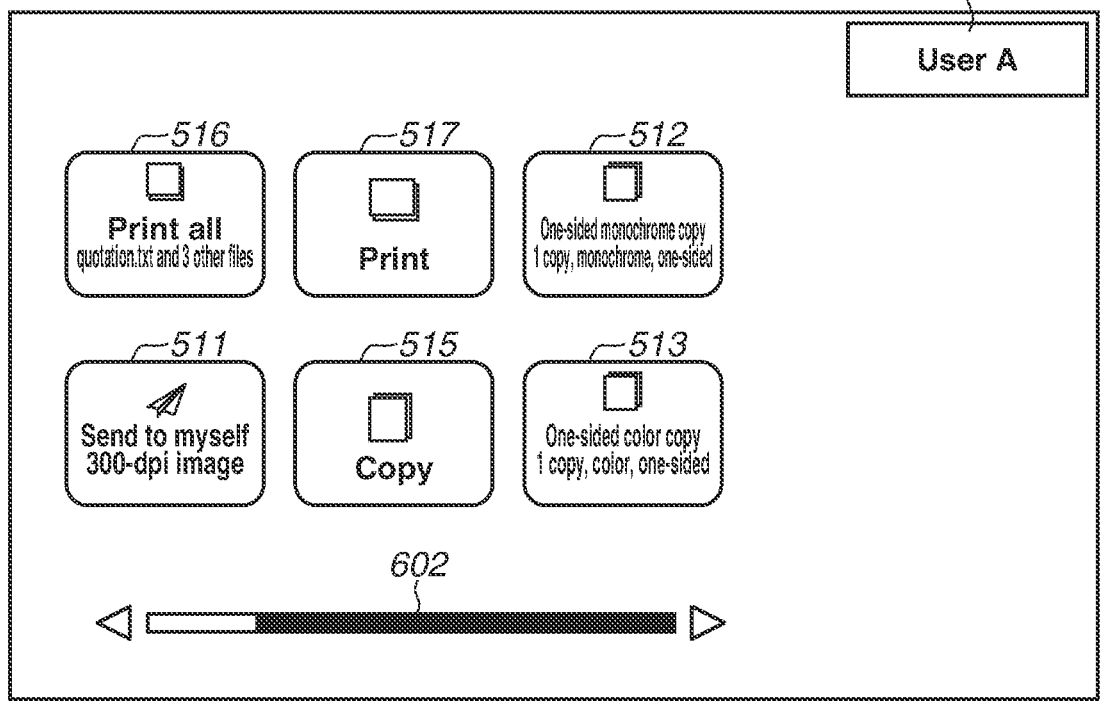
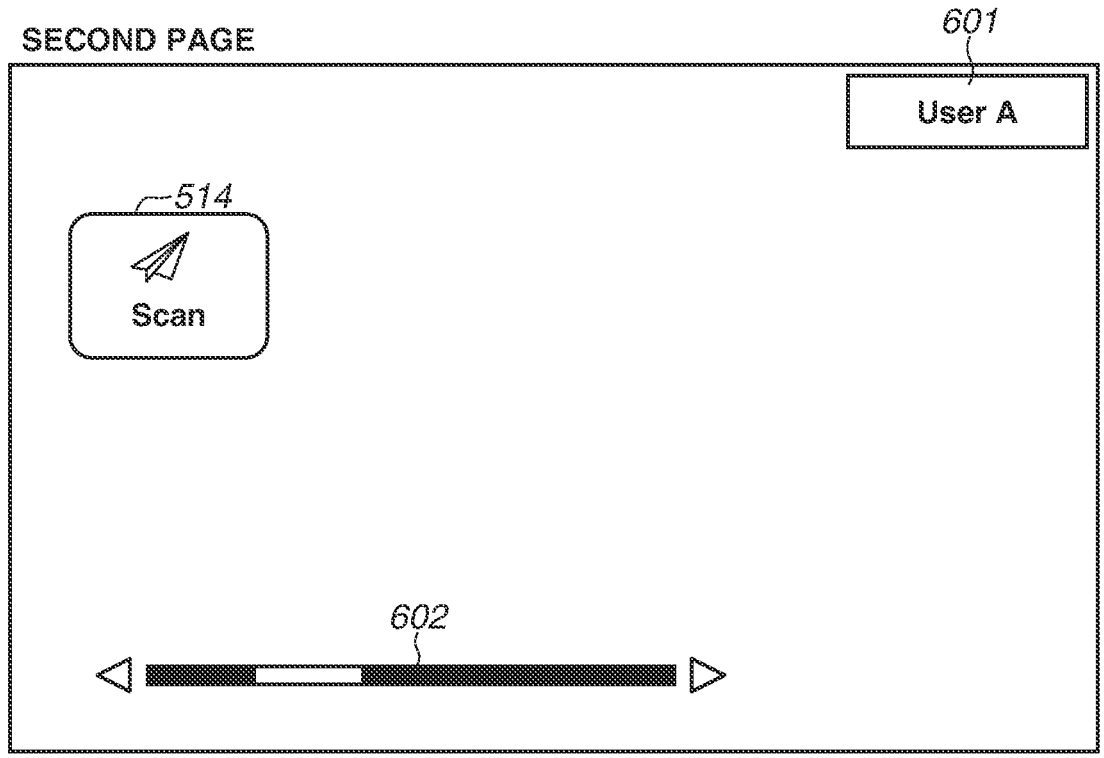

FIG.17

| Button ID 501 (b) | Button name 502 | Application to be called 503 | Setting value 504 |
|---|---|---|---|
| B001 | Send to myself | transmission application 423 | to: <<owneraddress>>, two-sided, blancSkip |
| B002 | One-sided monochrome copy | copy application 421 | 1copies, BW, one-sided |
| B003 | One-sided color copy | copy application 421 | 1copies, AutoColor, one-sided |
| B004 | Scan | transmission application 423 | |
| B005 | Copy | copy application 421 | |
| B006 | Print all | print application 422 | allprint |
| B007 | Print | print application 422 | |
| B008 | Store an estimate report | transmission application 423 | to: \\folder\..., two-sided, blancSkip |
| ... | ... | ... | ... |

511 — B001 row
512 — B002 row
513 — B003 row
514 — B004 row
515 — B005 row
516 — B006 row
517 — B007 row
518 — B008 row

FIG. 18

| State (s) | | | Button ID (b) | | | | | | | |
|---|---|---|---|---|---|---|---|---|---|---|
| | Presence or absence of placed document | Presence or absence of unprinted document | Store an estimate report (b = B008) | Send to myself (b = B001) | One-sided monochrome copy (b = B002) | One-sided color copy (b = B003) | Scan (b = B004) | Copy (b = B005) | Print all (b = B006) | Print (b = B007) |
| (s = S00) | 0 | 0 | 263 | 17 | 36 | 5 | 4 | 263 | 2 | 1 |
| (s = S01) | 0 | 1 | 2534 | 2475 | 2534 | 3 | 2 | 31 | 2387 | 1676 |
| (s = S10) | 1 | 0 | 87 | 87 | 86 | 15 | 4 | 33 | 2 | 1 |
| (s = S11) | 1 | 1 | 404 | 5 | 404 | 3 | 2 | 1 | 27 | 6 |

| State (s) | | Button ID (b) | | | | | |
|---|---|---|---|---|---|---|---|
| | Presence or absence of placed document | Presence or absence of unprinted document | Send to myself (b = B001) | One-sided monochrome copy (b = B002) | One-sided color copy (b = B003) | Scan (b = B004) | Copy (b = B005) | Print all (b = B006) | Print (b = B007) |
| (s = S00) | 0 | 0 | 7 | 6 | 5 | 4 | 3 | 2 | 1 |
| (s = S01) | 0 | 1 | 5 | 4 | 3 | 2 | 1 | 7 | 6 |
| (s = S10) | 1 | 0 | 7 | 6 | 5 | 4 | 3 | 2 | 1 |
| (s = S11) | 1 | 1 | 5 | 4 | 3 | 2 | 1 | 7 | 6 |

FIG.21B

| State (s) | | Button ID (b) | | | | | |
|---|---|---|---|---|---|---|---|
| | Presence or absence of placed document | Presence or absence of unprinted document | Send to myself (b = B001) | One-sided monochrome copy (b = B002) | One-sided color copy (b = B003) | Scan (b = B004) | Copy (b = B005) | Print all (b = B006) | Print (b = B007) |
| (s = S00) | 0 | 0 | 5 | 10 | 1 | 1 | 80 | 0 | 0 |
| (s = S01) | 0 | 1 | 0 | 0 | 0 | 0 | 0 | 57 | 40 |
| (s = S10) | 1 | 0 | 35 | 39 | 6 | 1 | 15 | 0 | 0 |
| (s = S11) | 1 | 1 | 1 | 90 | 0 | 0 | 0 | 6 | 1 |

| State (s) | Presence or absence of placed document | Presence or absence of unprinted document | Button ID (b) | | | | | |
|---|---|---|---|---|---|---|---|---|
| | | | Send to myself (b = B001) | One-sided monochrome copy (b = B002) | One-sided color copy (b = B003) | Scan (b = B004) | Copy (b = B005) | Print all (b = B006) | Print (b = B007) |
| (s = S00) | 0 | 0 | 5 | 10 | 1 | 1 | 80 | 0 | 0 |
| (s = S01) | 0 | 1 | 0 | 0 | 0 | 0 | 0 | 57 | 40 |
| (s = S10) | 1 | 0 | 45 | 39 | 6 | 1 | 15 | 0 | 0 |
| (s = S11) | 1 | 1 | 1 | 90 | 0 | 0 | 0 | 6 | 1 |

| State (s) | Presence or absence of placed document | Presence or absence of unprinted document | Button ID (b) | | | | | |
|---|---|---|---|---|---|---|---|---|
| | | | Send to myself (b = B001) | One-sided monochrome copy (b = B002) | One-sided color copy (b = B003) | Scan (b = B004) | Copy (b = B005) | Print all (b = B006) | Print (b = B007) |
| (s = S00) | 0 | 0 | 5 | 10 | 1 | 1 | 80 | 0 | 0 |
| (s = S01) | 0 | 1 | 0 | 0 | 0 | 0 | 0 | 57 | 40 |
| (s = S10) | 1 | 0 | 42 | 36 | 5 | 0 | 14 | 0 | 0 |
| (s = S11) | 1 | 1 | 1 | 90 | 0 | 0 | 0 | 6 | 1 |

FIG. 24A

| State (s) | | Button ID (b) | | | | | | |
|---|---|---|---|---|---|---|---|---|
| | Presence or absence of placed document | Presence or absence of unprinted document | Send to myself (b = B001) | One-sided monochrome copy (b = B002) | One-sided color copy (b = B003) | Scan (b = B004) | Copy (b = B005) | Print all (b = B006) | Print (b = B007) |
| (s = S00) | 0 | 0 | 5 | 10 | 1 | 1 | 80 | 0 | 0 |
| (s = S01) | 0 | 1 | 0 | 0 | 0 | 0 | 0 | 57 | 40 |
| (s = S10) | 1 | 0 | 38 | 32 | 4 | 0 | 12 | 0 | 0 |
| (s = S11) | 1 | 1 | 1 | 90 | 0 | 0 | 0 | 6 | 1 |

| State (s) | | Button ID (b) | | | | | | |
|---|---|---|---|---|---|---|---|---|
| | Presence or absence of placed document | Presence or absence of unprinted document | Send to myself (b = B001) | One-sided monochrome copy (b = B002) | One-sided color copy (b = B003) | Scan (b = B004) | Copy (b = B005) | Print all (b = B006) | Print (b = B007) |
| (s = S00) | 0 | 0 | 5 | 10 | 1 | 1 | 80 | 0 | 0 |
| (s = S01) | 0 | 1 | 0 | 0 | 0 | 0 | 0 | 57 | 40 |
| (s = S10) | 1 | 0 | 48 | 32 | 4 | 0 | 12 | 0 | 0 |
| (s = S11) | 1 | 1 | 1 | 90 | 0 | 0 | 0 | 6 | 1 |

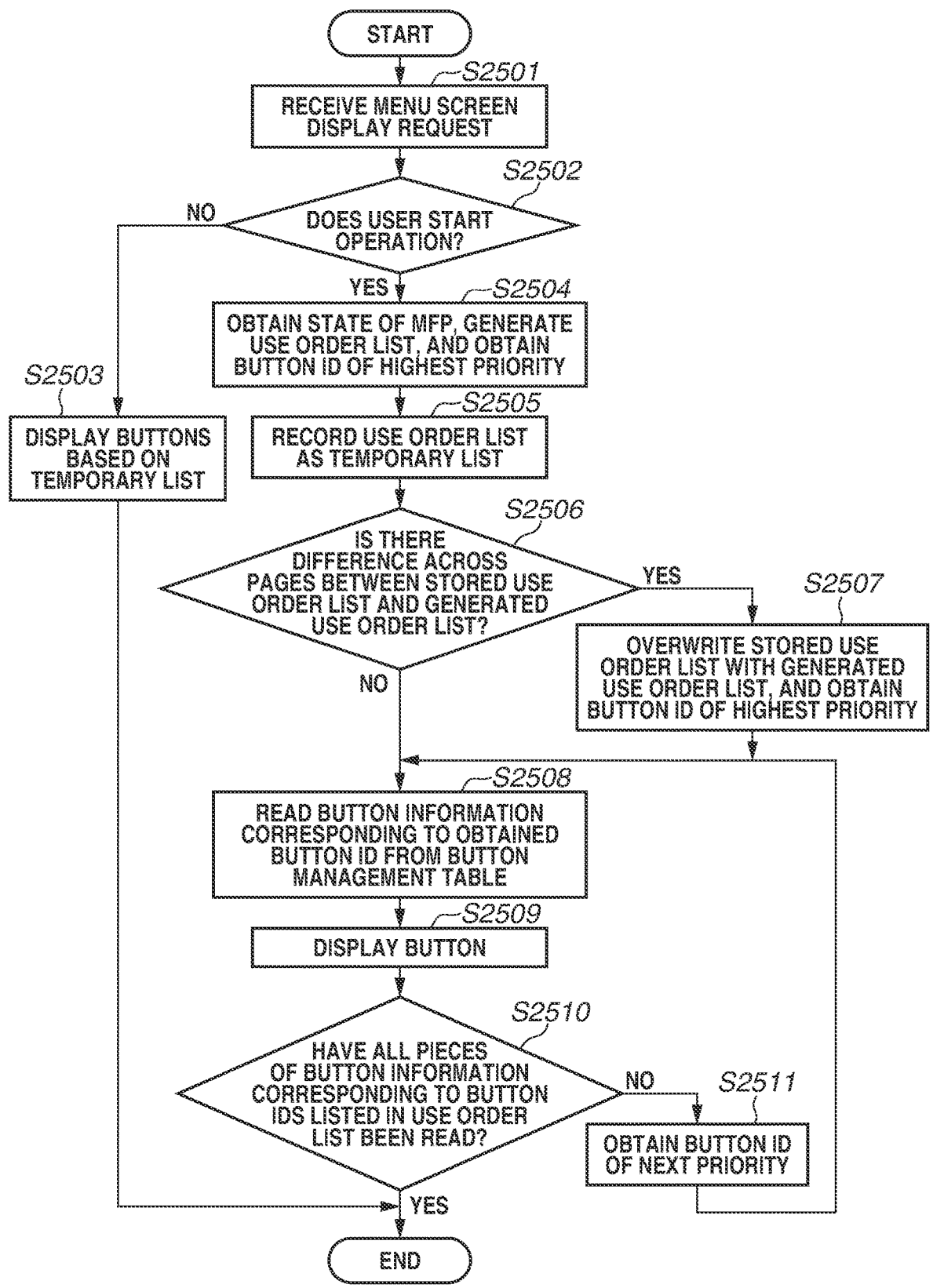

FIG.26A
FIRST PAGE
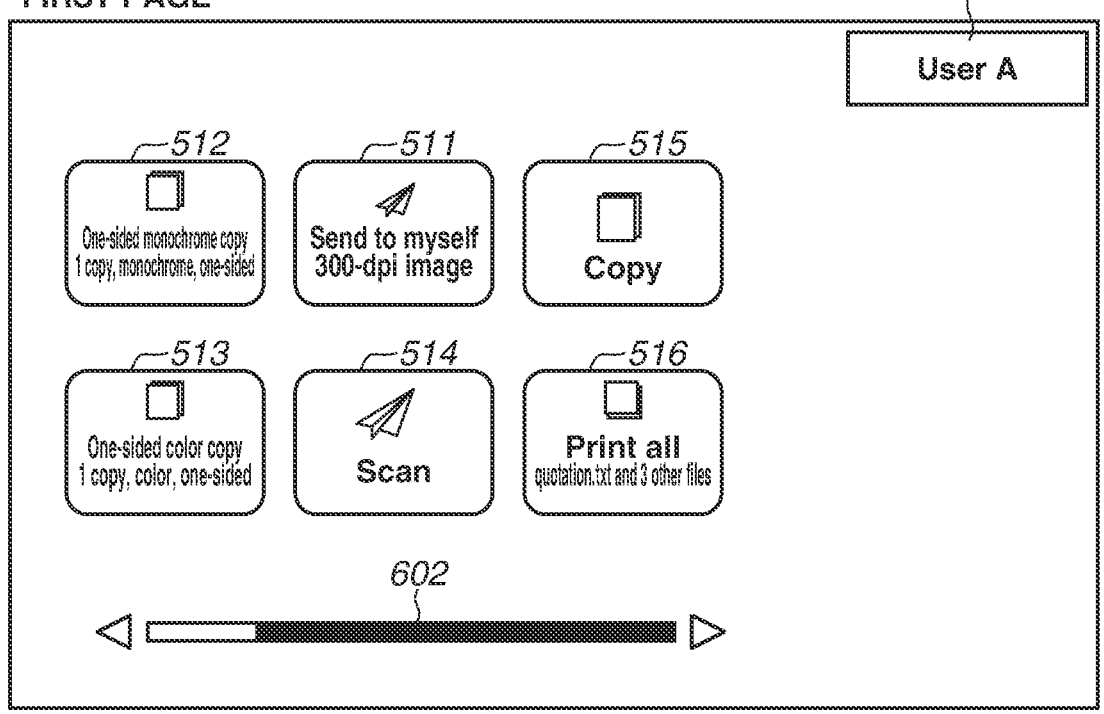
SECOND PAGE
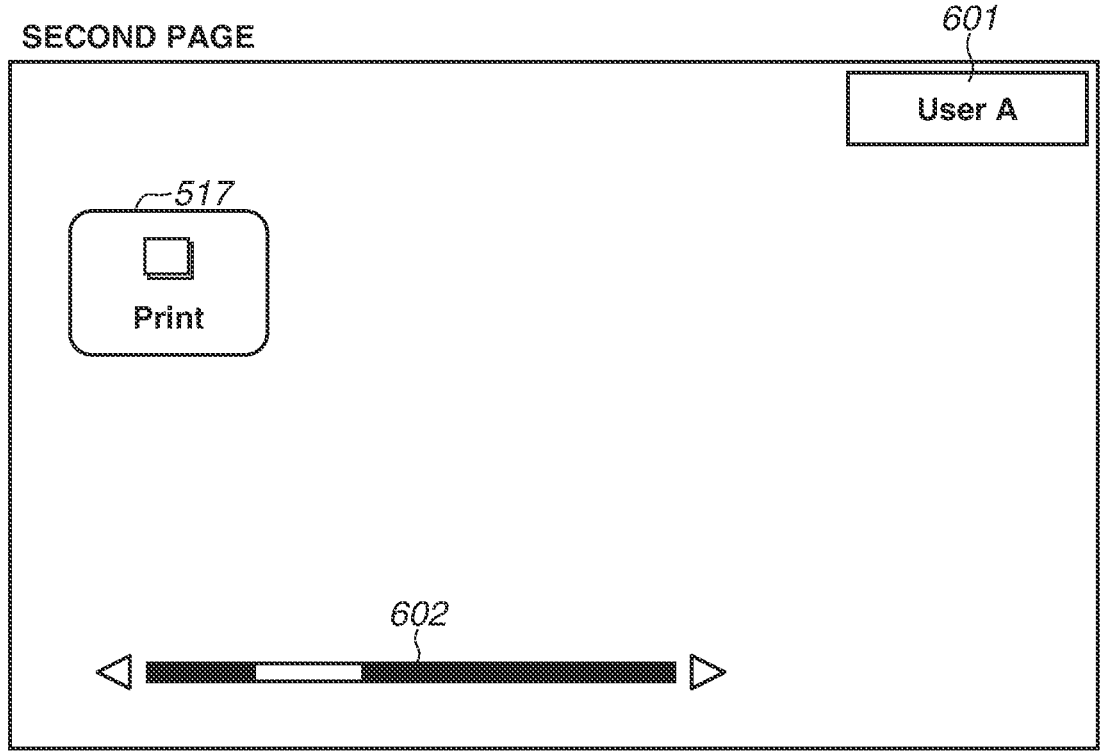

FIG.26B
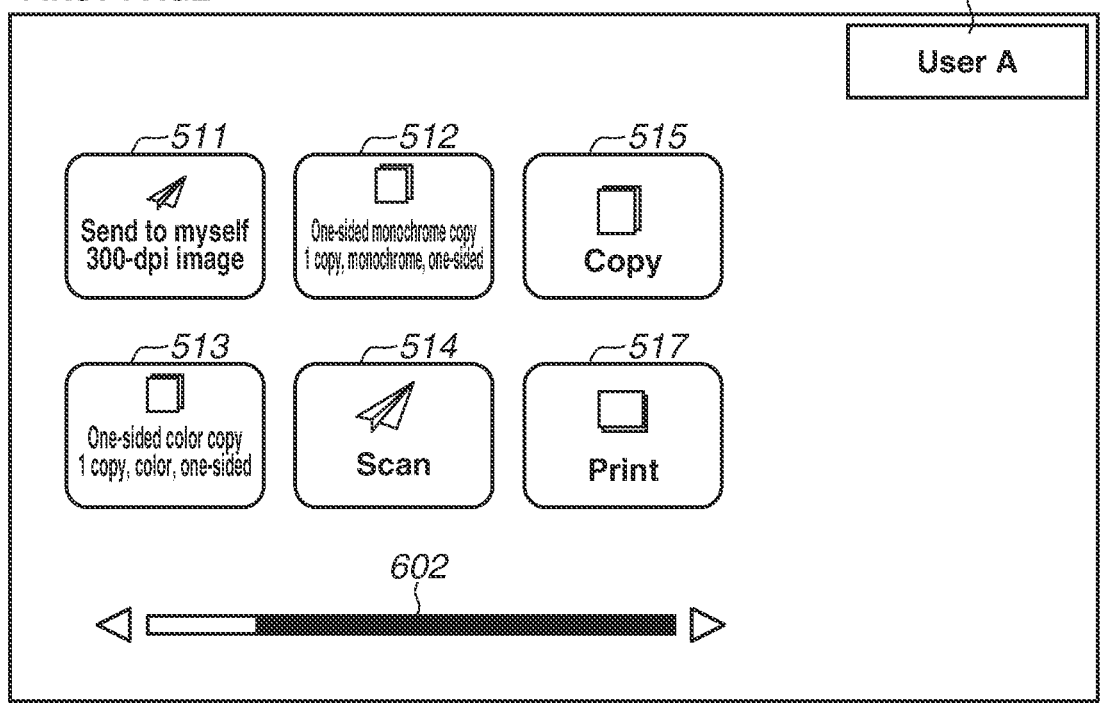
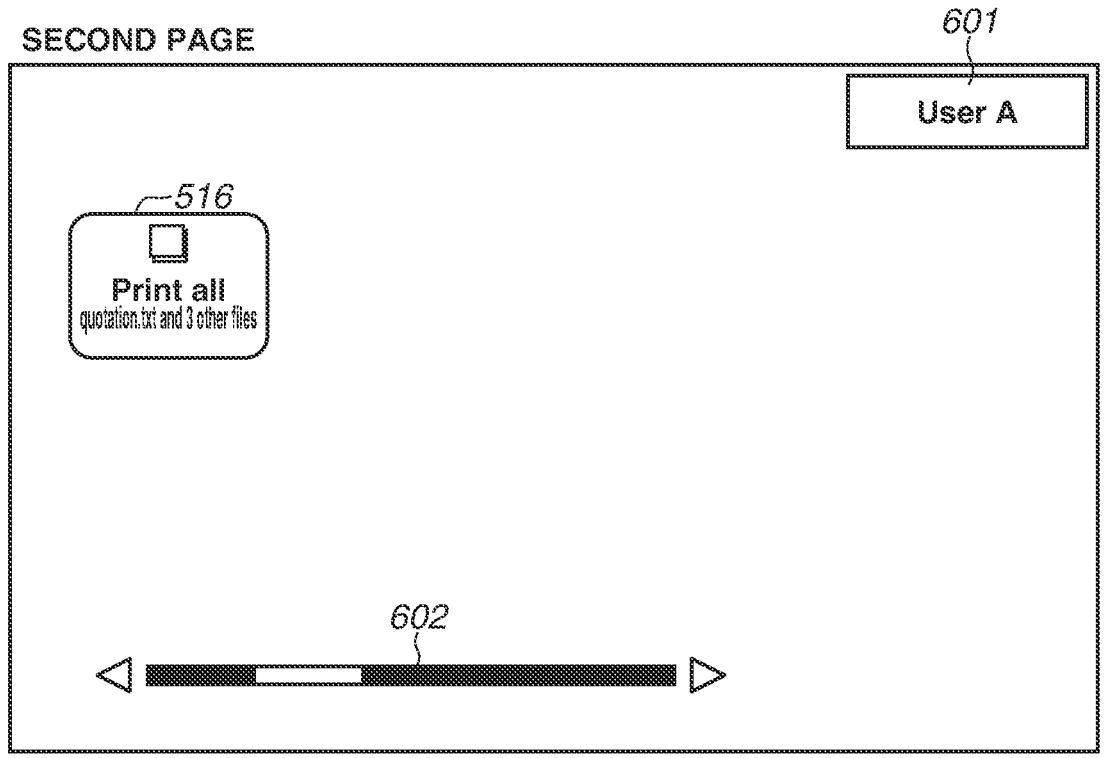

FIG. 27

| State (s) | Presence or absence of placed document | Presence or absence of unprinted document | Button ID (b) | | | | | | |
|---|---|---|---|---|---|---|---|---|---|
| | | | Send to myself (b = B001) | One-sided monochrome copy (b = B002) | One-sided color copy (b = B003) | Scan (b = B004) | Copy (b = B005) | Print all (b = B006) | Print (b = B007) |
| (s = S00) | 0 | 0 | 17 | 36 | 5 | 4 | 263 | 2 | 1 |
| (s = S01) | 0 | 1 | 5 | 14 | 3 | 2 | 31 | 2307 | 1676 |
| (s = S10) | 1 | 0 | 87 | 86 | 15 | 4 | 31 | 2 | 3 |
| (s = S11) | 1 | 1 | 5 | 404 | 3 | 2 | 1 | 27 | 6 |

INFORMATION PROCESSING APPARATUS, METHOD FOR CONTROLLING INFORMATION PROCESSING APPARATUS, AND STORAGE MEDIUM

BACKGROUND

Field of the Disclosure

The present disclosure relates to an information processing apparatus, a method for controlling an information processing apparatus, and a storage medium.

Description of the Related Art

Multi functional printers (MFPs) having menu screens are becoming more commonly installed in offices. As the functions of the MFPs increase, the menu screens display more buttons for executing processing. Users then make operations for selecting an intended button from a large number of buttons. To support such user operations, Japanese Patent Application Laid-Open No. 2008-236028 discusses a technique for changing the display order of buttons displayed on a menu screen based on the user's operation history and a document type. As another method, the display order of buttons can be changed based on the numbers of uses of the buttons by the user.

However, if the display order of the buttons is changed by such a method, the following issue can occur when, for example, the user continues to execute processing. Suppose that the display order of the buttons is changed as a result of the execution of the processing for the first time by the user pressing a button. If the user presses the button to execute the processing for the second time in succession, the user can get confused because the display order of the buttons has been changed since the first time.

SUMMARY

Embodiments of the present disclosure are directed to improving a user's operability in operating an information processing apparatus that automatically changes the display order of buttons.

According to some embodiments, the information processing apparatus includes a display control unit configured to display a plurality of display objects for giving an instruction to execute processing on an operation screen, and a change unit configured to change a display order of the plurality of display objects displayed on the operation screen in a case where the operation screen is displayed after occurrence of an event to change the display order of the plurality of display objects. The change unit controls change of the display order of the plurality of display objects displayed on the operation screen based on a state of the information processing apparatus, in a case where the operation screen is displayed after the occurrence of the event to change the display order of the plurality of display objects.

Further features of the present disclosure will become apparent from the following description of exemplary embodiments with reference to the attached drawings.

BRIEF DESCRIPTION OF THE DRAWINGS

FIG. 5 is a diagram illustrating an example of a button management table.

FIGS. 11A to 11C are diagrams illustrating examples of a use history management table.

FIG. 14 is a diagram illustrating an example of a use history management table.

FIG. 15 is a diagram illustrating an example of a menu screen.

FIG. 17 is a diagram illustrating an example of a button management table.

FIG. 18 is a diagram illustrating an example of a use history management table.

FIGS. 21A to 21D are diagrams illustrating examples of a use history management table.

FIGS. 24A and 24B are diagrams illustrating examples of a use history management table.

FIG. 25 is a flowchart illustrating menu screen display processing according to a sixth exemplary embodiment.

FIGS. 26A and 26B are diagrams illustrating examples of a menu screen.

FIG. 27 is a diagram illustrating an example of a use history management table.

DESCRIPTION OF THE EMBODIMENTS

A first exemplary embodiment of the present disclosure will now be described with reference to the attached drawings.

Figure 1:
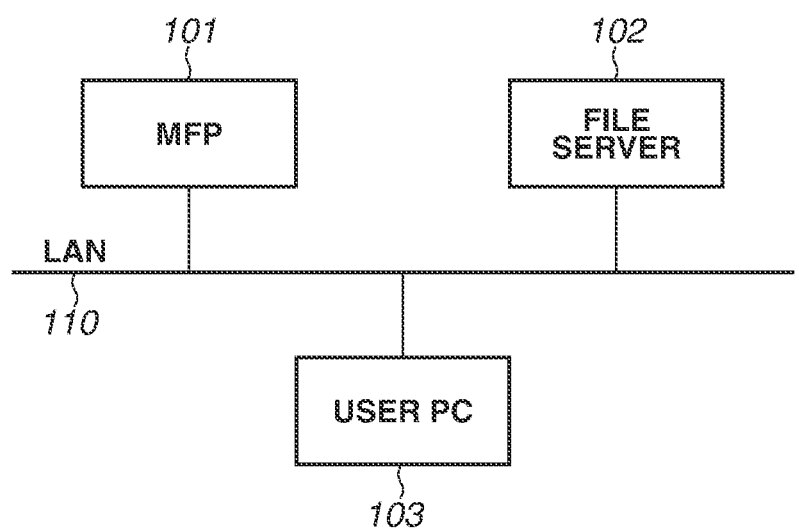
FIG. 1 is a diagram illustrating an overall configuration example of an information processing system.

FIG. 1 is a diagram illustrating an overall configuration example of an information processing system. The information processing system includes a multi functional printer (MFP) 101, a file server 102, and a user personal computer (PC) 103. The MFP 101, the file server 102, and the user PC 103 can communicate with each other via a local area network (LAN) 110. In FIG. 1, the MFP 101, the file server 102, and the user PC 103 are configured as a single apparatus each. However, the MFP 101, the file server 102, and the user PC 103 may include a plurality of apparatuses each.

The MFP 101 is an image processing apparatus (information processing apparatus) including a scanner and a printer. The file server 102 is a server including a network folder to which the MFP 101 and the user PC 103 can refer. The file server 102 can serve as a transmission destination of image data scanned by the MFP 101. The user PC 103 is a PC that a user uses to conduct business. The user PC 103 can transmit print data to be printed by the MFP 101 to the MFP 101 by using a printer driver based on user operations. The LAN 110 is a wired or wireless LAN or wide area network (WAN).

Figure 2:
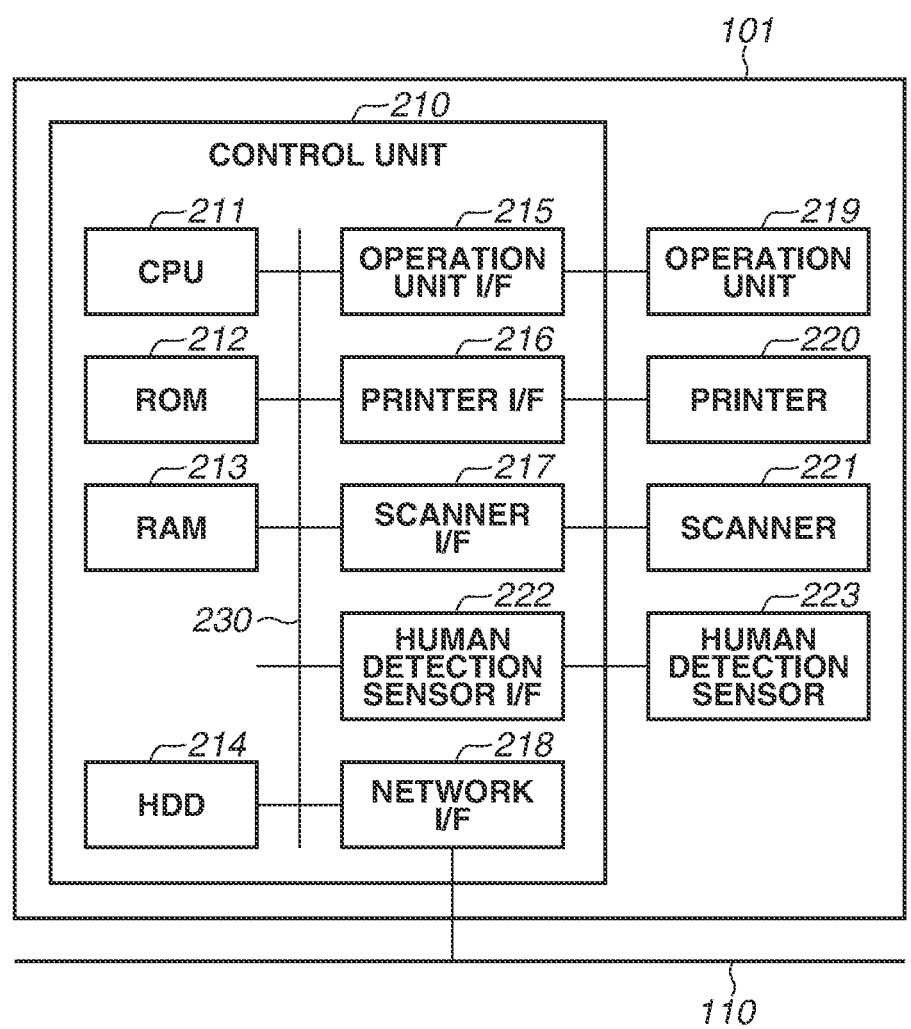
FIG. 2 is a diagram illustrating a hardware configuration example of a multi functional printer (MFP).

FIG. 2 is a block diagram illustrating a hardware configuration of the MFP 101. The MFP 101 controls display contents of a menu screen described below, which is displayed on an operation unit 219, and performs operations based on user instructions given via the operation unit 219. A control unit 210 including a central processing unit (CPU) 211 controls the operation of the entire MFP 101. The CPU 211 reads control programs stored in a read-only memory (ROM) 212 and/or a hard disk drive (HDD) 214, and performs various types of control processing, such as image data reading control and image data transmission control. A random access memory (RAM) 213 is used as a temporary storage area, such as a main memory and a work area of the CPU 211. The HDD 214 stores image data and various programs. The control unit 210 includes various interfaces (I/Fs), such as an operation unit I/F 215, a printer I/F 216, a scanner I/F 217, a network I/F 218, and a human detection sensor I/F 222. The ROM 212, the RAM 213, the HDD 214, and the various I/Fs are connected to the CPU 211 via a bus 230.

The operation unit I/F 215 connects the operation unit 219 and the control unit 210. The operation unit 219 includes a liquid crystal display unit having a touch panel function, and a keyboard. The operation unit 219 displays an operation screen. The printer I/F 216 connects a printer 220 and the control unit 210. Image data to be printed by the printer 220 is transferred from the control unit 210 to the printer 220 via the printer I/F 216, and printed on a recording medium by the printer 220. The scanner I/F 217 connects a scanner 221 and the control unit 210. The scanner 221 reads a document stacked thereon to generate image data, and inputs the image data to the control unit 210 via the scanner I/F 217. The scanner 221 also inputs a state whether there is a document stacked thereon into the control unit 210. The network I/F 218 connects the control unit 210 (MFP 101) to the LAN 110. The network I/F 218 transmits and receives various types of information to/from other devices on the LAN 110. The human detection sensor I/F 222 connects a human detection sensor 223 and the control unit 210. The human detection sensor 223 detects the presence of a human near the MFP 101, and inputs the detection result into the control unit 210 via the human detection sensor I/F 222.

Figure 3:
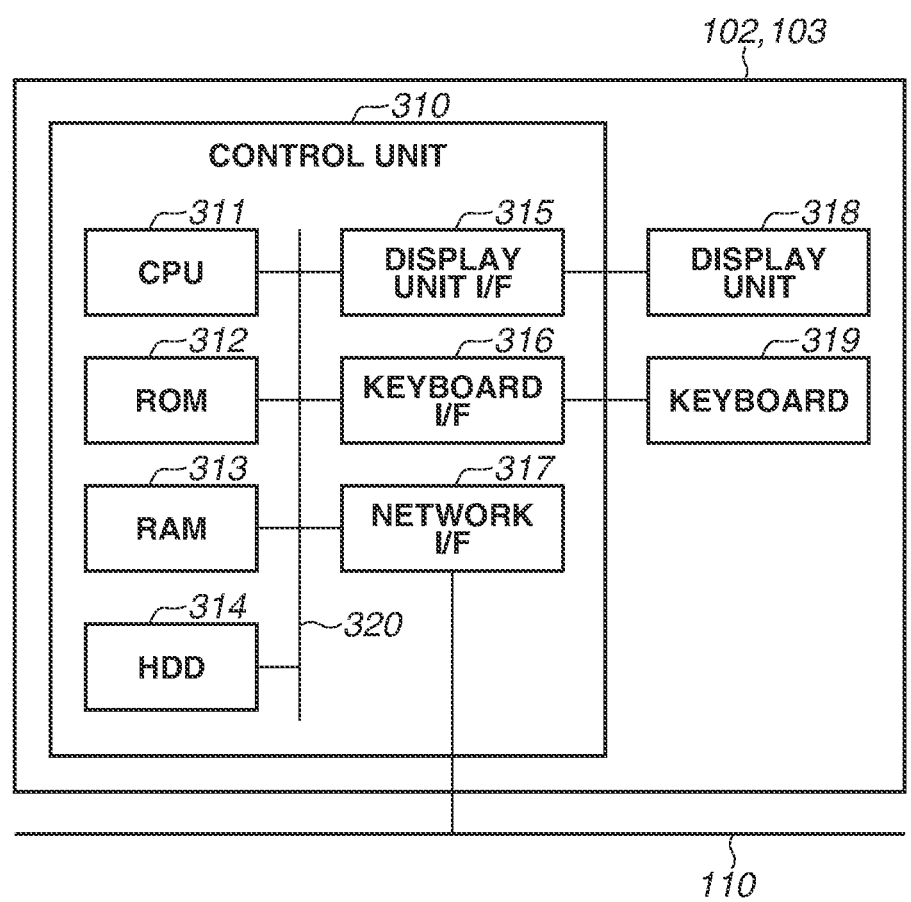
FIG. 3 is a diagram illustrating a hardware configuration example of a file server and a user personal computer (PC).

FIG. 3 is a block diagram illustrating a hardware configuration of the file server 102 and the user PC 103. A control unit 310 including a CPU 311 controls the operation of the entire apparatus. The CPU 311 reads control programs stored in a ROM 312 and/or an HDD 314, and performs various types of control processing. A RAM 313 is used as a temporary storage area, such as a main memory and a work area of the CPU 311. The HDD 314 stores various programs and data. The control unit 310 includes various I/Fs, such as a display unit I/F 315, a keyboard I/F 316, and a network I/F 317. The ROM 312, the RAM 313, the HDD 314, and the various I/Fs are connected to the CPU 311 via a bus 320.

The display unit I/F 315 connects a display unit 318 and the control unit 310. The keyboard I/F 316 connects a keyboard 319 and the control unit 310. The CPU 311 recognizes instructions from the user via the keyboard 319, and makes a screen displayed on the display unit 318 transition based on the recognized instructions. The network I/F 317 connects the control unit 310 to the LAN 110. The network I/F 317 transmits and receives various types of information to/from other devices on the LAN 110.

Figure 4:
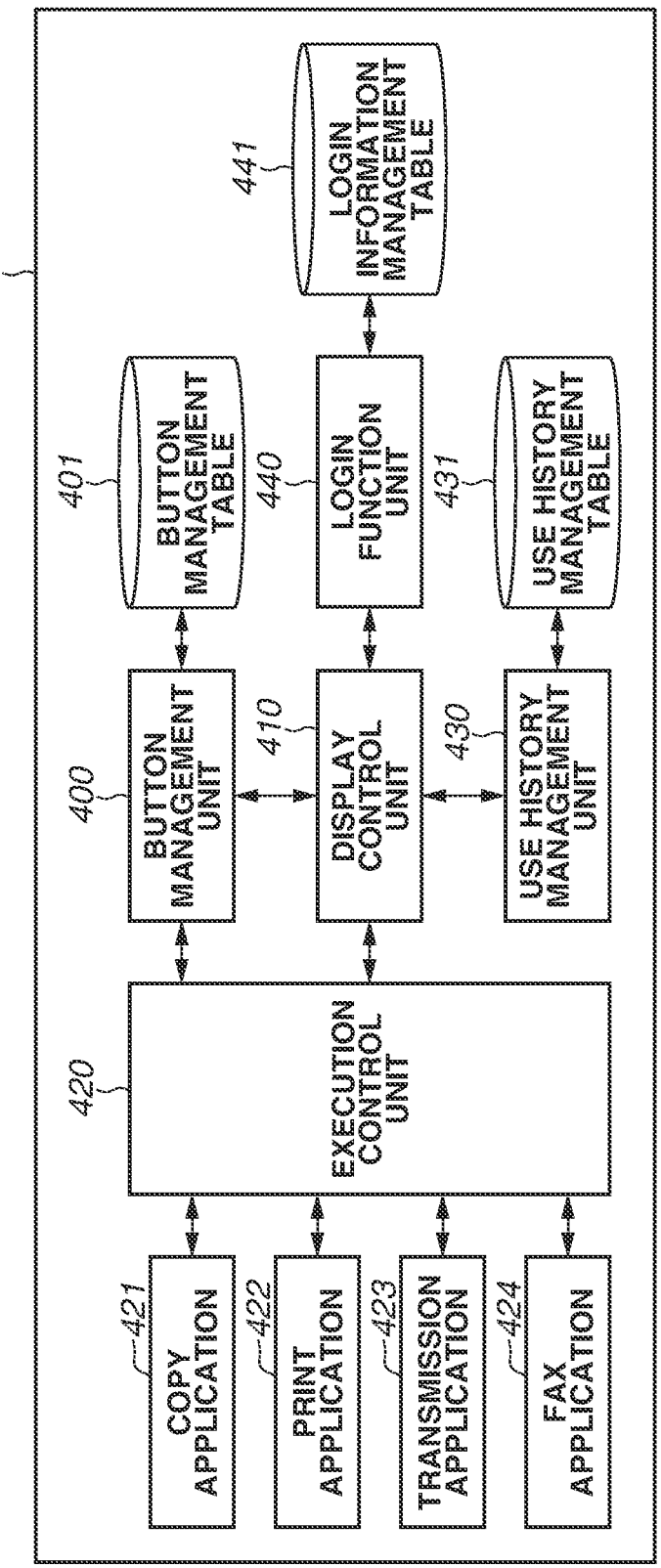
FIG. 4 is a diagram illustrating a functional configuration example of the MFP.

FIG. 4 is a block diagram illustrating a functional configuration of the MFP 101 according to the present exemplary embodiment. The CPU 211 reads the programs stored in the HDD 214 of the MFP 101 into the RAM 213 and analyzes and executes the programs, whereby a button management unit 400, a display control unit 410, an execution control unit 420, a use history management unit 430, and a login function unit 440 function. The functional components will now be described in detail.

The button management unit 400 manages buttons (display objects) to be displayed on the menu screen. A button management table 401 is a data table (an example of which is illustrated in FIG. 5) storing information about the buttons to be displayed on the menu screen. The button management table 401 is stored in the RAM 213 or the HDD 214.

The display control unit 410 controls display of the buttons on the menu screen. Specifically, the display control unit 410 performs processing for rearranging the display positions of the buttons stored in the button management table 401 based on the order of priority (display order) in a use order list obtained from a use history management table 431 described below. The display control unit 410 also instructs the execution control unit 420 to call an application corresponding to the selected button when a button displayed on the menu screen is detected to be selected by the user. The display control unit 410 also provides the execution control unit 420 with setting values as parameters, along with the instruction to call the application.

The execution control unit 420 manages various applications installed on the MFP 101 and performs application processing based on instructions from the display control unit 410. As employed herein, application processing refers to processing for calling an application to execute a job or processing for calling an application to display a setting screen on the operation unit 219. A copy application 421 is an application for providing a copy function. A print application 422 is an application for providing a reservation print function. The reservation print function is a function of once storing print data received from the user PC 103 into the HDD 214 as an unprinted document and printing the unprinted document based on an additional instruction from the user instead of immediately printing the print data. A transmission application 423 is an application for providing a function of transmitting scanned image data. The network folder on the file server 102 can be specified as the transmission destination of the scanned image data. A facsimile (FAX) application 424 is an application for providing a FAX function. The applications installed on the MFP 101 are not limited to the copy application 421, print application 422, transmission application 423, and FAX application 424, and other applications may be installed.

The use history management unit 430 manages a history of button operations for each state of the MFP 101. Specifically, a use point stored in the use history management table 431 is updated when a button displayed on the menu screen is detected to be operated by the user. The use history management table 431 is a data table (examples of which are illustrated in FIGS. 11A to 11C) storing use points indicating the number of uses of the respective buttons for each state of the MFP 101. The use history management table 431 is stored in the RAM 213 or the HDD 214. In the present exemplary embodiment, the state of the MFP 101 is expressed by a combination of a state whether there is a stacked document and a state whether there is an unprinted document.

The login function unit 440 performs processing for providing an authentication function of the MFP 101. Specifically, the login function unit 440 manages a display language to be displayed on the operation unit 219 user by user, and manages unprinted documents user by user. The login function unit 440 stores state information about whether the authentication function is on or off into the HDD 214 when the authentication function is turned on or off via the operation unit 219. The login function unit 440 refers to the state information about whether the authentication function is on or off. If the authentication function is on, the login function unit 440 requests the user to log in to operate the MFP 101. If the authentication function is off, no login is needed to operate the MFP 101. A login information management table 441 is a table storing users' identifiers (IDs), passwords, usernames, and other information to be managed user by user. The login information management table 441 is stored in the RAM 213 or the HDD 214. Examples of the information to be managed user by user include users' display language information and information about unprinted documents. The information to be managed user by user is not limited thereto.

FIG. 5 illustrates an example of the button management table 401 according to the present exemplary embodiment. In the example illustrated in FIG. 5, each row represents button information defining a button. The button management table 401 stores seven pieces of button information, e.g., button information 511 to button information 517. Each piece of button information includes the following fields: a button ID 501, a button name 502, an application to be called 503, and a setting value 504. The button ID 501 indicates an ID for uniquely identifying the button. The button name 502 indicates a name to be displayed on the button on the menu screen, and expresses the content of a job to be performed by the called application. The application to be called 503 indicates the application to be called when the button is selected by the user. The setting value 504 indicates a setting value or values to be provided as a parameter or parameters in calling the application.

The button information 511 includes "B001" for the button ID 501, "Send to myself" for the button name 502, "transmission application 423" for the application to be called 503, and setting values are set for the setting value 504. The button information 512 includes "B002" for the button ID 501, "One-sided monochrome copy" for the button name 502, "copy application 421" for the application to be called 503, and setting values are set for the setting value 504. The button information 513 includes "B003" for the button ID 501, "One-sided color copy" for the button name 502, "copy application 421" for the application to be called 503, and setting values are set for the setting value 504. The button information 514 includes "B004" for the button ID 501, "Scan" for the button name 502, "transmission application 423" for the application to be called 503, and no setting value is set for the setting value 504. The button information 515 includes "B005" for the button ID 501, "Copy" for the button name 502, "copy application 421" for the application to be called 503, and no setting value is set for the setting value 504. The button information 516 incudes "B006" for the button ID 501, "Print all" for the button name 502, "print application 422" for the application to be called 503, and a setting value is set for the setting value 504. The button information 517 includes "B007" for the button ID 501, "Print" for the button name 502, "print application 422" for the application to be called 503, and no setting value is set for the setting value 504.

Buttons defined by button information with a setting value or values for the setting value 504 (e.g., the button information 511 in FIG. 5) will be referred to as custom buttons. In FIG. 5, the buttons defined by the button information 511, 512, 513, and 516 are custom buttons. By contrast, buttons defined by button information with no setting value for the setting value 504 will be referred to as application buttons. In FIG. 5, the buttons defined by the button information 514, 515, and 517 are application buttons. If an application button is selected, the application is called with initial settings.

FIGS. 6A to 6F illustrate examples of the menu screen according to the present exemplary embodiment. The MFP 101 displays the menu screen on the operation unit 219 of the MFP 101.

Figure 6A:
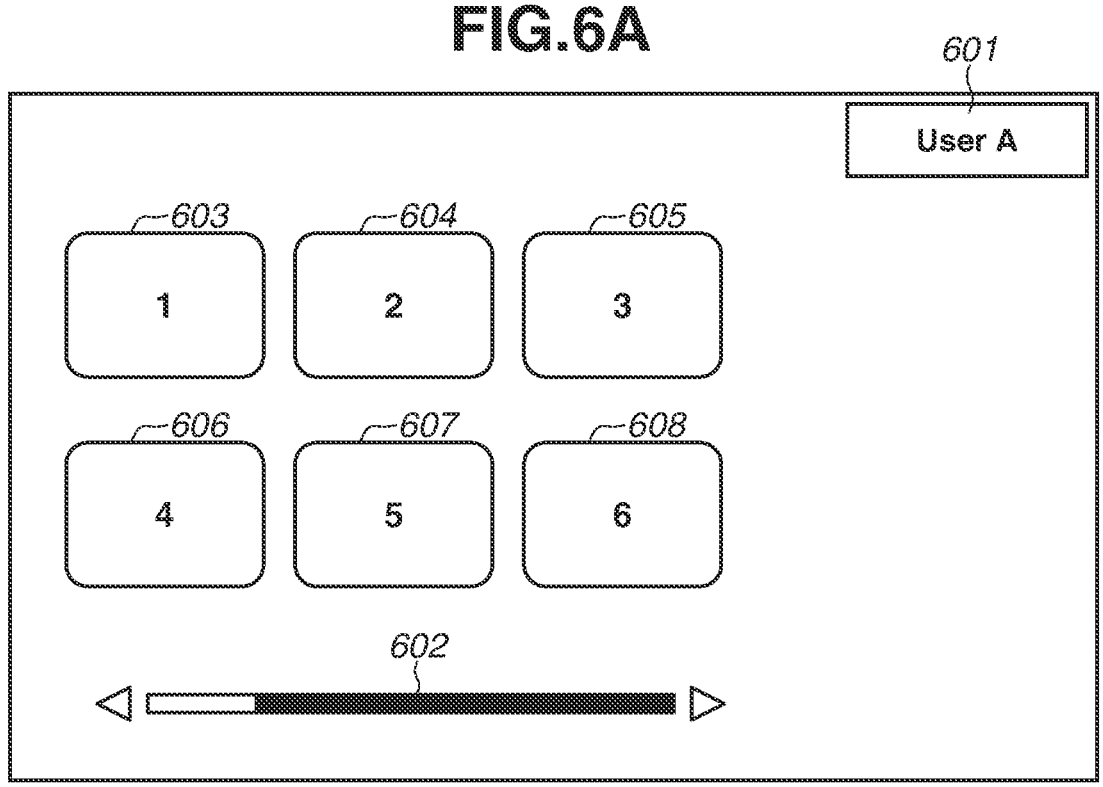
FIGS. 6A to 6F are diagrams illustrating examples of a menu screen.

FIG. 6A illustrates an outline of the menu screen. If a login user is recognized by the login function unit 440, a username 601 is displayed. On the first page of the menu screen, a predetermined number (the present exemplary embodiment has six) of buttons are arranged. If the number of buttons to be displayed on the menu screen is greater than the predetermined number, the rest is/are arranged on the subsequent page(s). If the menu screen includes a plurality of pages, a page scrollbar 602 is displayed. The page to be displayed can be changed by operating the page scrollbar 602. A large number of buttons are thus displayed on a plurality of pages into which the menu screen is divided. The MFP 101 arranges buttons in order from left to right and top to bottom based on the priorities of the buttons. Specifically, a button having the highest priority is located in a first button area 603 at the top left, and a button having the second priority in a second button area 604 at the top center. A button having the third priority is then located in a third button area 604 at the top right, one having the fourth priority in a fourth button area 606 at the bottom left, one having the fifth priority in a fifth button area 607 at the bottom center, and one having the sixth priority in a sixth button area 608 at the bottom right, based on the priorities. Buttons having the seventh and subsequent priorities are similarly arranged on the second and subsequent pages.

FIGS. 6B to 6F illustrate specific display examples of the menu screen. FIGS. 6B to 6F illustrate the first page of the menu screen.

Figure 6B:
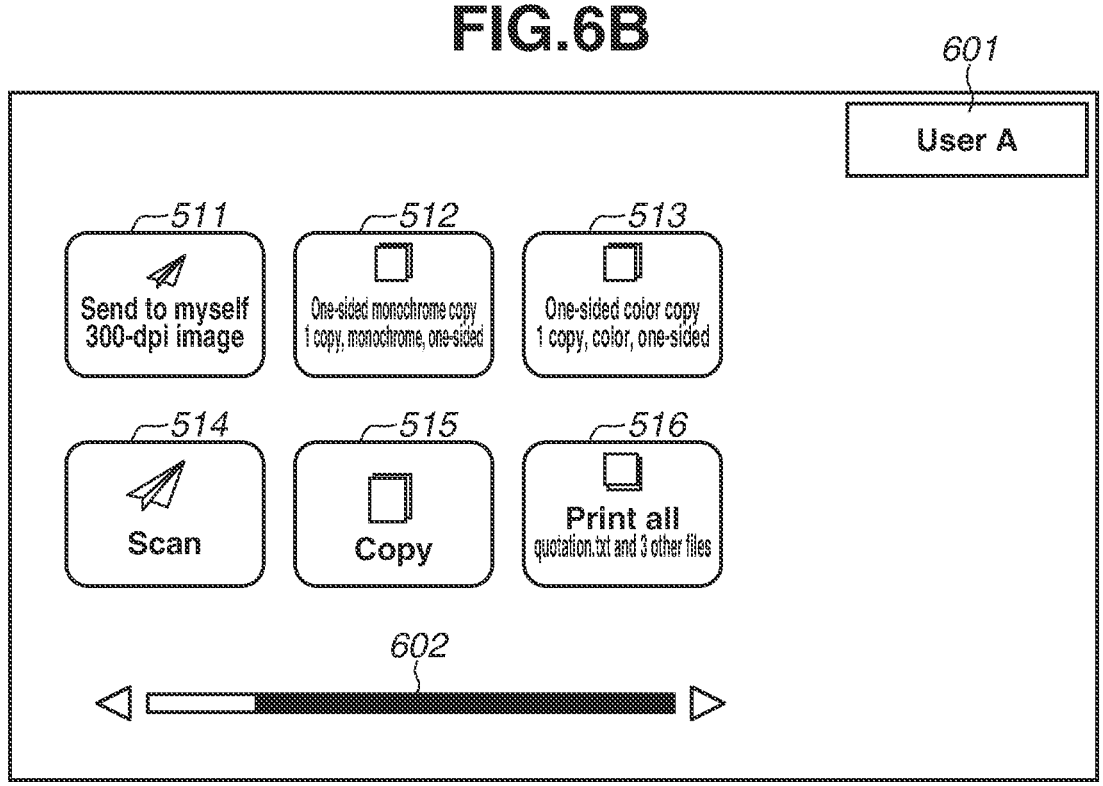

FIG. 6B illustrates an example of the menu screen in a state where no job has been performed yet and there is no stacked document or unprinted document. The buttons defined by the button information 511, the button information 512, the button information 513, the button information 514, the button information 515, and the button information 516 are arranged in this order at the positions of the first, second, third, fourth, fifth, and sixth button areas 603, 604, 605, 606, 607, and 608 of FIG. 6A, respectively.

Figure 6C:
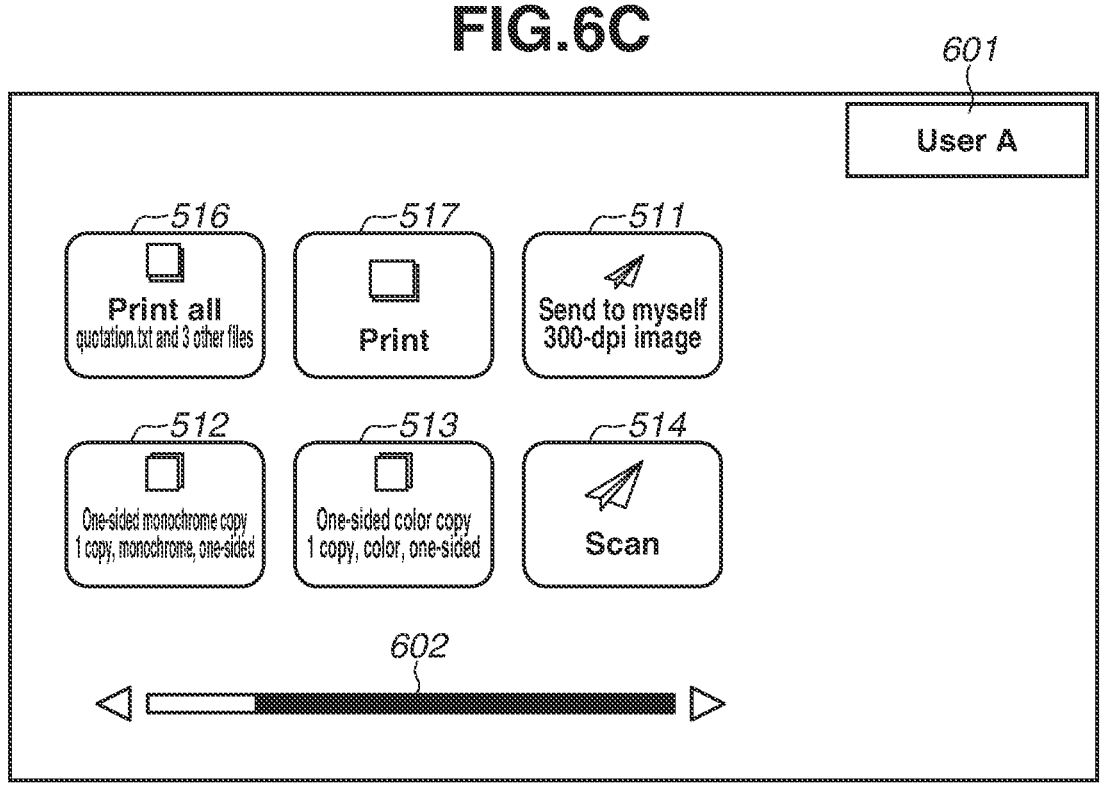

FIG. 6C illustrates an example of the menu screen in a state where no job has been performed yet and there is no stacked document but an unprinted document. The buttons defined by the button information 516, the button information 517, the button information 511, the button information 512, the button information 513, and the button information 514 are displayed in this order at the positions of the first to sixth button areas 603, 604, 605, 606, 607, and 608 of FIG. 6A, respectively.

Figure 6D:
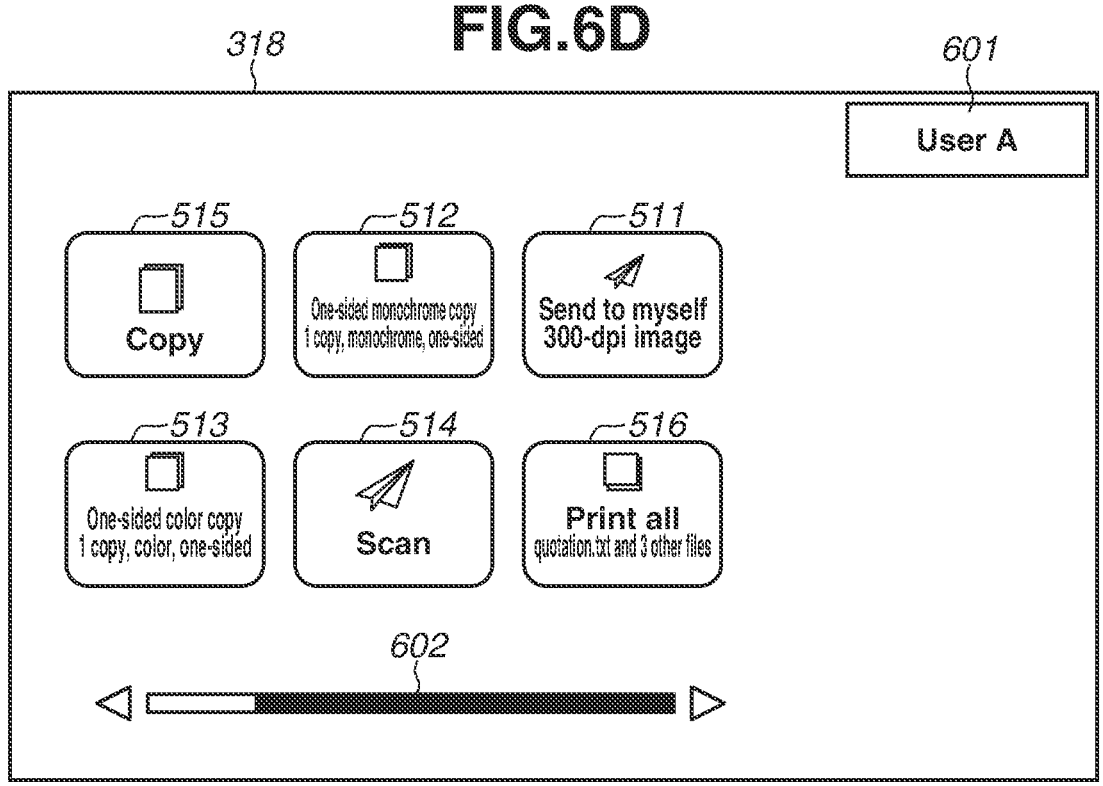

FIG. 6D illustrates an example of the menu screen in a state where jobs have been executed 500 times and there is no stacked document or unprinted document. The buttons defined by the button information 515, the button information 512, the button information 511, the button information 513, the button information 514, and the button information 516 are displayed in this order at the positions of the first to sixth button areas 603, 604, 605, 606, 607, and 608 of FIG. 6A, respectively.

Figure 6E:
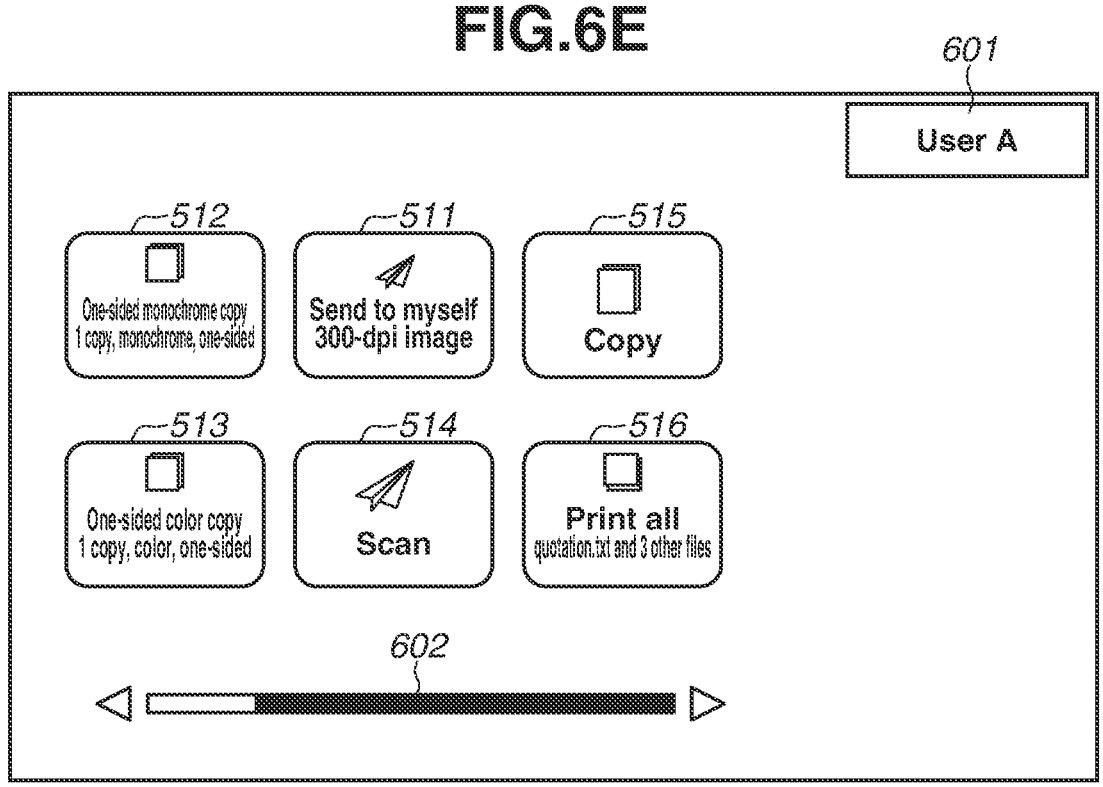

FIG. 6E illustrates an example of the menu screen in a state where jobs have been executed 500 times and there is a stacked document and no unprinted document. The buttons defined by the button information 512, the button information 511, the button information 515, the button information 513, the button information 514, and the button information 516 are displayed in this order at the positions of the first to sixth button areas 603, 604, 605, 606, 607, and 608 of FIG. 6A, respectively.

Figure 6F:
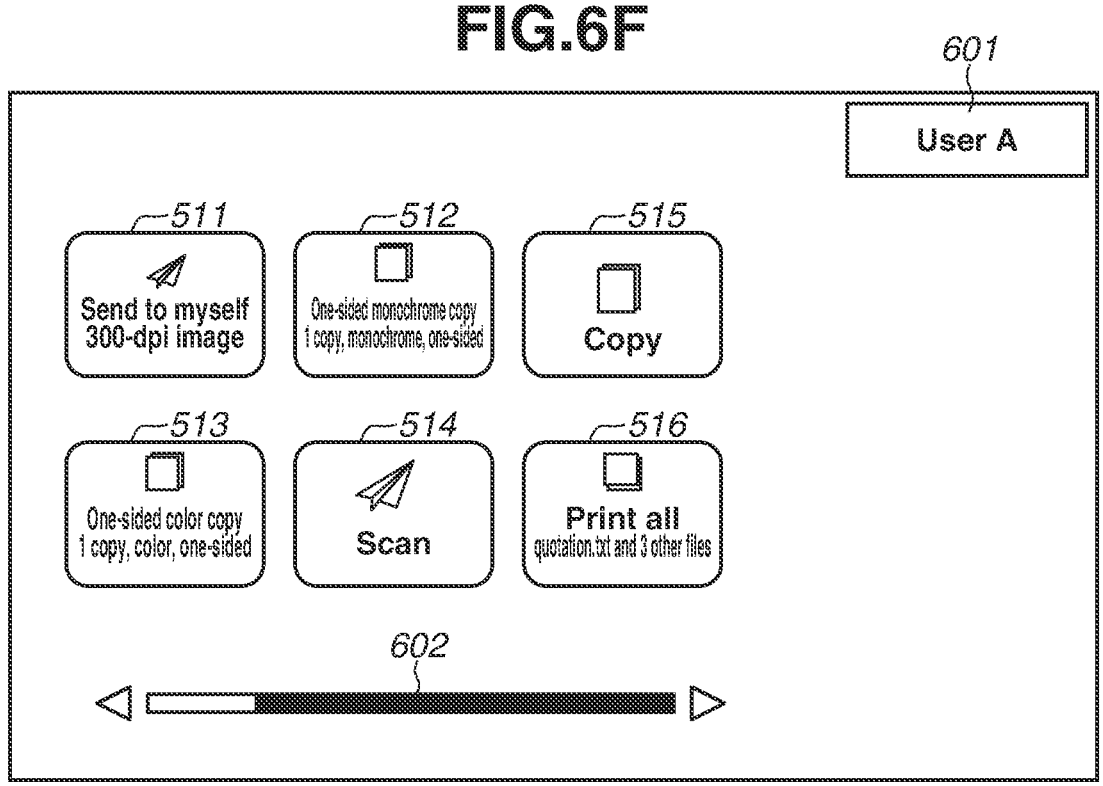

FIG. 6F illustrates an example of the menu screen in a state where jobs have been executed 501 times and there is a stacked document and no unprinted document. The buttons defined by the button information 511, the button information 512, the button information 515, the button information 513, the button information 514, and the button information 516 are displayed in this order at the positions of the first to sixth button areas 603, 604, 605, 606, 607, and 608 of FIG. 6A, respectively.

As described above, the MFP 101 changes the display positions of the buttons based on the number of times of job execution (the numbers of uses of the buttons) and the state of the MFP 101. The reason of the display position change is that the priorities of the buttons change. The time when the buttons are actually displayed at the changed positions is the time when the user starts to operate the MFP 101. Details will be described below. In FIGS. 6B to 6F, the buttons (in FIG. 5, seven buttons) defined by the button information stored in the button management table 401 (in FIG. 5, button information 511 to 517) are displayed. The custom buttons (in FIG. 5, the button information 511, 512, 513, and 516) and the application buttons (in FIG. 5, the button information 514, 515, and 517) have different designs for easy identification. In the present exemplary embodiment, an application button displays an icon representing the application to be executed and a button name. A custom button includes a setting summary area displaying a setting value or values, aside from an icon representing the application to be executed and a button name. While in the present exemplary embodiment the buttons are used as display objects for calling the applications, other components may be used. For example, a list may be used to display items. In the case of using a list, the display control unit 410 displays items having the highest priorities from the top, one lower priority one row below. In other words, the display control unit 410 changes a display mode of the menu items based on the priorities.

Figure 7:
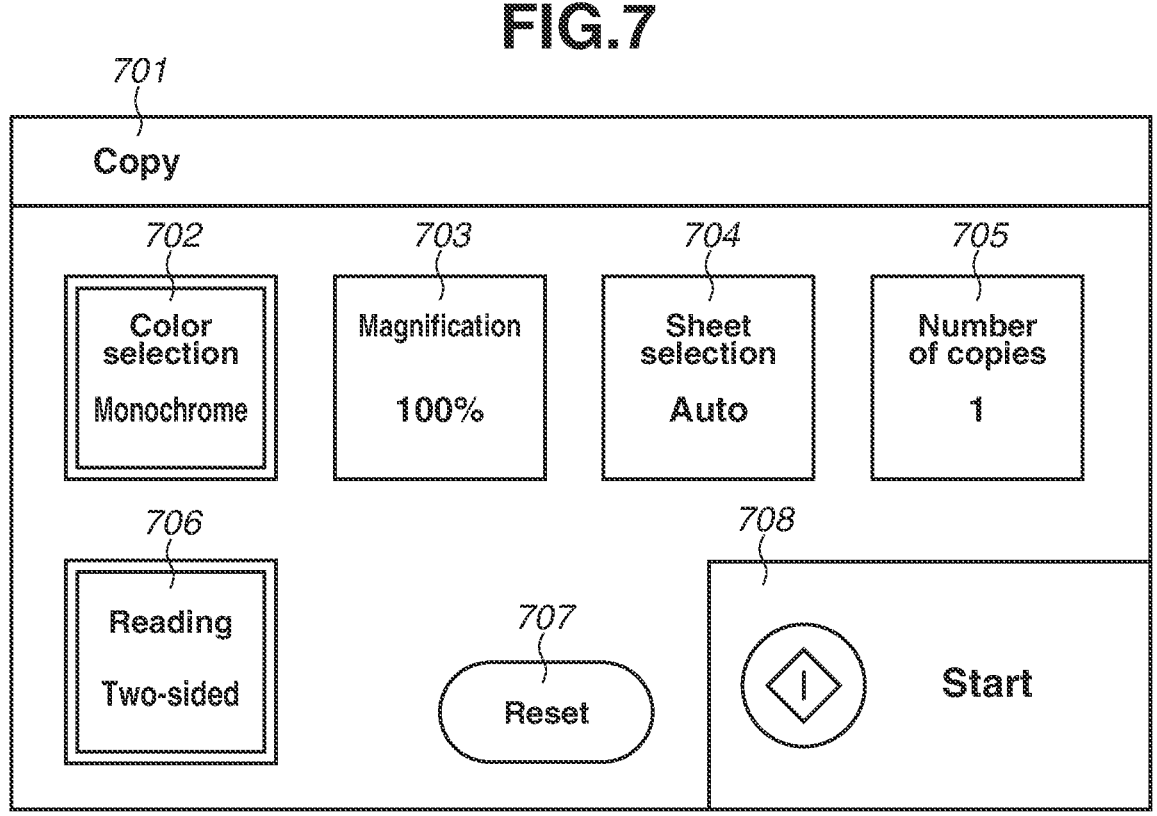
FIG. 7 is a diagram illustrating an example of a setting screen.

FIG. 7 illustrates an example of an application setting screen called when the user presses the setting summary area of a custom button on the menu screen. With reference to FIG. 7, a case will be described where the setting summary area of the custom button defined by the button information 512 of FIG. 5 is pressed. Since the application to be called 503 in the button information 512 is defined as "copy application 421", the copy application 421 is called.

A label 701 is an area displaying the name of the called application. Here, "Copy" is displayed. Areas 702 to 706 indicate the current setting values of the copy application 421. The setting value 504 in the button information 512 includes "1 (1 copies)", "monochrome (BW)", and "one-sided". Meanwhile, the area 705 indicating the setting value of the number of copies displays "1", the area 702 indicating the setting value of color selection displays "Monochrome", and the area 706 indicating the setting value of reading displays "Two-sided". The areas indicating setting values not defined in the button information 512 (areas 703 and 704) display default values. The areas 702 to 706 are represented by double-lined frames if the setting values have been changed from their default values. In FIG. 7, the area 702 (the default value for color selection is "color") and the area 706 (the default value for reading is "one-sided") are represented by double-lined frames since the setting values are different from the default values. The area 705 is represented by a single-lined frame because the setting value 504 in the button information 512 includes "1copies" as the setting value of the number of copies and the default value for the number of copies is "1", i.e., the setting value and the default value are the same. If any one of the areas 702 to 706 is pressed, the MFP 101 displays a dialog (not illustrated) for changing the setting value. A reset button 707 is a button for restoring all the setting values to the default values. A start button 708 is a button for starting to execute the job with the current setting values.

Figure 8:
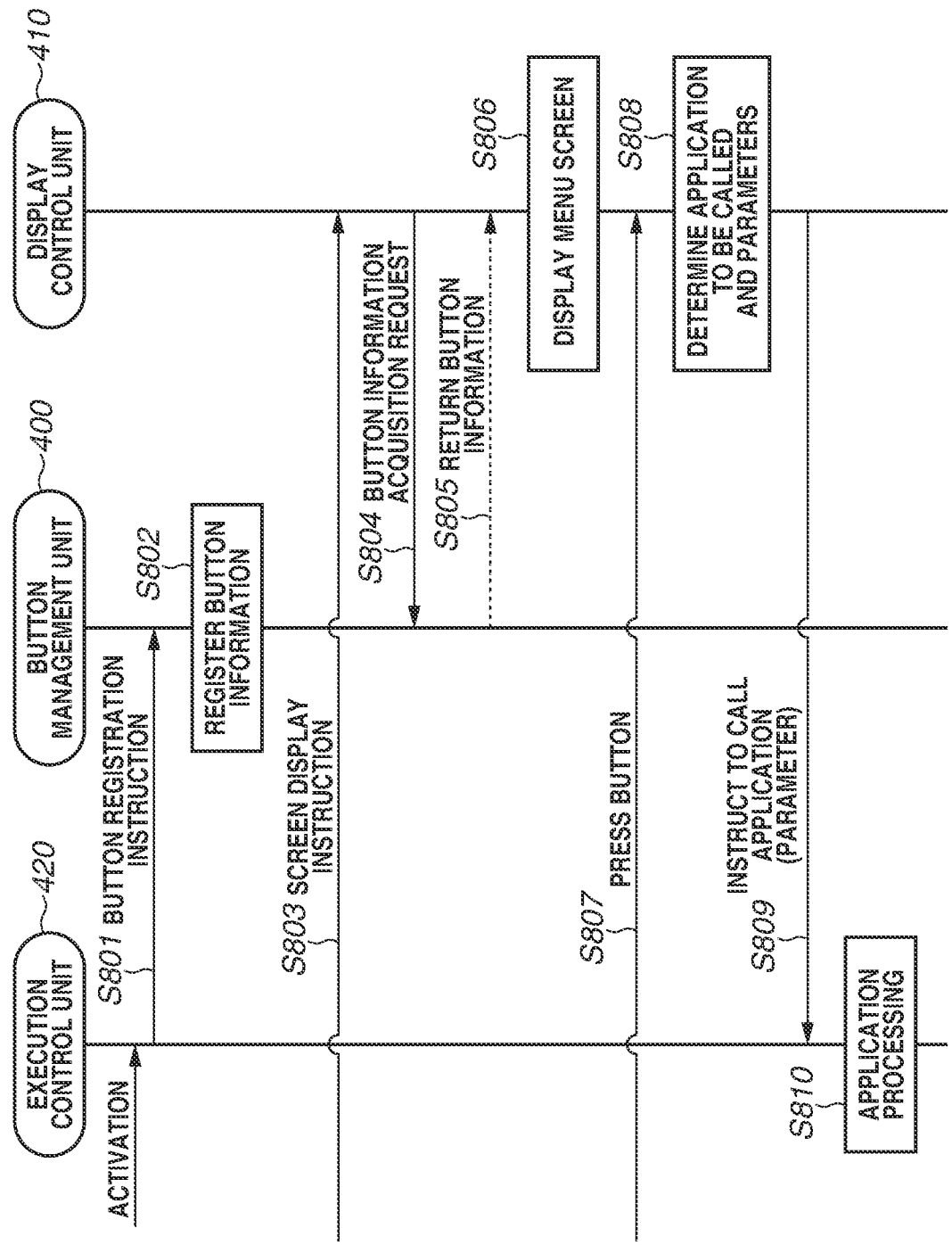
FIG. 8 is a sequence diagram illustrating a procedure of a series of processes performed by the MFP.

FIG. 8 is a sequence diagram illustrating a procedure of a series of processes performed by the MFP 101. Steps S801 and S802 of FIG. 8 are processes for registering buttons. Steps S803 to S806 are processes for displaying the menu screen. Steps S807 to S810 of FIG. 8 are processes for calling an application started by pressing a button on the menu screen. The processes in the sequence of FIG. 8 and the processing of steps in flowcharts to be described below are implemented by the CPU 211 reading the programs stored in the HDD 214 of the MFP 101 into the RAM 213 and analyzing and executing the programs.

In step S801, the execution control unit 420 initially issues a button registration instruction to the button management unit 400 when each of the applications 421 to 424 is activated. While in FIG. 8 the timing to register a button is the application activation timing, buttons may be registered at another timing. The button registration instruction includes button information (button name 502, application to be called 503, and setting value 504 in FIG. 5). In step S802, the button management unit 400 having received the button registration instruction assigns a button ID 501 to the received button information and registers the button information in the button management table 401.

In step S803, the display control unit 410 receives a screen display instruction. In step S804, the display control unit 410 issues a button information acquisition request to the button management unit 400. In step S805, the button management unit 400 returns the button information to the display control unit 410 as a response to the button information acquisition request issued in step S804. In step S806, the display control unit 410 displays the menu screen on the operation unit 219 based on the button information obtained in step S805.

In step S807, the display control unit 410 detects an operation made by the user (pressing of a button). In step S808, the display control unit 410 determines the application to be called and parameters to be provided in calling the application based on the user's operation detected in step S807. In step S809, the display control unit 410 instructs the execution control unit 420 to call the application based on the determination made in step S808. In step S810, the execution control unit 420 performs application processing based on the provided parameters.

Figure 9:
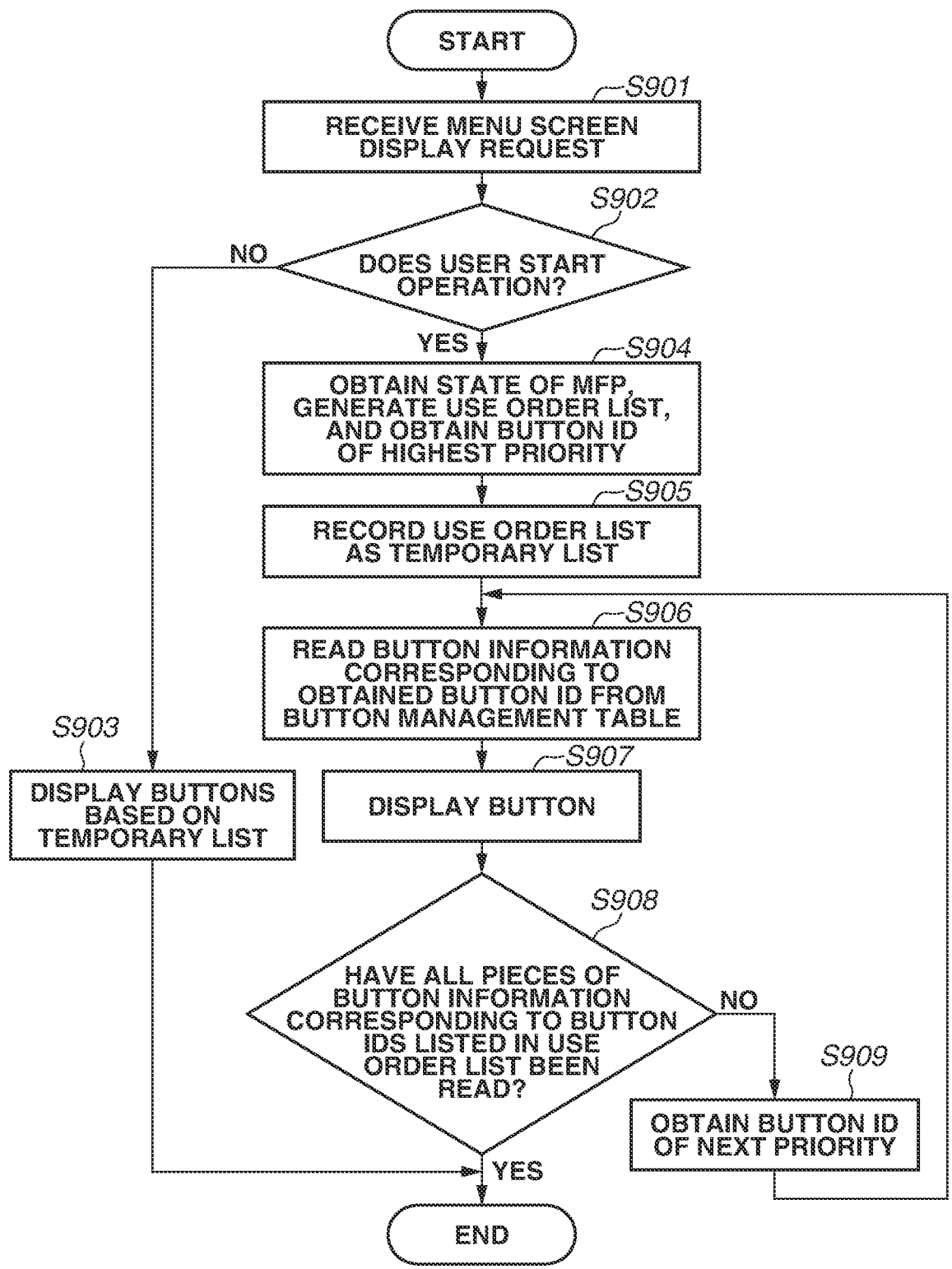
FIG. 9 is a flowchart illustrating menu screen display processing according to a first exemplary embodiment.

FIG. 9 is a flowchart illustrating menu screen display processing according to the present exemplary embodiment. The MFP 101 displays the menu screen on the operation unit 219 through the menu screen display processing. The menu screen display processing corresponds to the processes performed in steps S803 to S806 in the sequence diagram of FIG. 8.

In step S901, the display control unit 410 receives a menu screen display request. Specifically, the display control unit 410 receives the menu screen display request if a user's predetermined operation is detected or a system notification is received. For example, an internal system timer (not illustrated) measures an elapsed time since the last user operation, and issues a notification if a user operation is made after a lapse of a predetermined time.

In step S902, the CPU 211 determines whether it is suggested that a user starts operation. Examples of situations where it is suggested that a user starts operation include where the login function unit 440 succeeds in authenticating the login of the user in a case where the authentication function is on. Another example is where a user operation is detected after no user operation is detected for more than a predetermined time in a case where the authentication function is off Another example of situations where it is suggested that a user starts operation is when the human detection sensor 223 detects the presence of a user in front of the MFP 101 regardless of whether the authentication function is on or off. The situations where it is suggested that a user starts operation are not limited thereto. Another example may be when the MFP 101 returns from a sleep. If the CPU 211 determines it to be suggested that a user starts operation (YES in step S902), the processing proceeds to step S904. If the CPU 211 determines it to not be suggested that a user starts operation (NO in step S902), the processing proceeds to step S903. The CPU 211 is an example of a detection unit.

In step S904, the display control unit 410 obtains the state of the MFP 101, and reads the use points of the buttons corresponding the obtained state of the MFP 101 from the use history management table 431. The display control unit 410 then generates a use order list by using the read use points. The use order list is a list in which the button IDs are arranged in descending order of the use points, and indicates the display priorities of the buttons.

For example, FIG. 11B illustrates the use history management table 431 in a case where jobs have been executed 500 times. If the obtained state (s) of the MFP 101 is where there is a stacked document and no unprinted document (S10), the display control unit 410 generates the use order list by referring to the use points in a row 1101 of the use history management table 431 in FIG. 11B. Specifically:

Use order list={B002,B001,B005,B003,B004,B006, B007}.

The CPU 211 obtains the button ID of the highest priority in the generated use order list. Here, the CPU 211 obtains "B002".

In the present exemplary embodiment, the use history management table 431 is common for all users. However, the use history management unit 430 may be configured to manage use history management tables 431 user by user. In such a case, the display control unit 410 reads the use points in the use history management table 431 corresponding to an authenticated user and generates the use order list.

In step S905, the display control unit 410 records the use order list generated in step S904 into the RAM 213 or the HDD 214 as a temporary list. At this time, the CPU 211 discards the temporary list that has been recorded so far.

In step S906, the display control unit 410 reads the button information corresponding to the button ID obtained in step S904 or below-described step S909 from the button management table 401. In the present exemplary embodiment, the display control unit 410 here reads all the button information stored in the button management table 401 since the button management table 401 is common for all users. Alternatively, different buttons may be displayed for different users. Buttons may be given expiration dates. In such cases, the button management table 401 may include additional columns where the button management unit 400 manages the corresponding information button by button.

In step S907, the display control unit 410 displays a button at the position corresponding to the priority by using the button information read in step S906. Suppose that the button information 512 corresponding to the button ID "B002" is read in step S906. In such a case, as illustrated in FIG. 6E, the button name 502 "One-sided monochrome copy" in the button information 512 is displayed at the position corresponding to the first button area 603 illustrated in FIG. 6A.

In step S908, the display control unit 410 determines whether all the pieces of button information corresponding to the button IDs in the use order list recorded in step S905 have been read. If the display control unit 410 determines that all the pieces of button information have been read (YES in step S908), the processing of this flowchart ends. If the display control unit 410 determines that all the pieces of button information have not been read (NO in step S908), the processing proceeds to step S909. Since the current button ID is "B002" and there is a next button ID "B001" in the use order list, all the pieces of button information have not been read. The processing thus proceeds to step S909.

In step S909, the display control unit 410 obtains the button ID next to the currently read one in priority. The processing then returns to step S906. In step S906, the display control unit 410 reads the button information corresponding to the obtained button ID from the button management table 401. In such a manner, the display control unit 410 sequentially reads the pieces of button information corresponding to the button IDs in the use order list, and sequentially displays the buttons by using the read button information. If the button information corresponding to the button ID of the lowest priority is read and the button defined by the read button information is displayed, the processing of this flowchart ends. FIG. 6E illustrates the menu screen displayed when the use order list is generated with reference to the use points in the row 1101 of the use history management table 431 of FIG. 11B by the menu screen display processing described above.

In contrast, if, in step S902, it is determined to not be suggested that a user starts operation, the processing proceeds to step S903. In step S903, the display control unit 410 displays buttons on the menu screen based on the temporary list. The processing of this flowchart then ends. The temporary list is stored in the RAM 213 or the HDD 214 by previous execution of the processing of the flowchart of FIG. 9. In step S903, similar processing to that of steps S906 to S909 described above is performed. In other words, if a user does not start to operate the MFP 101 (for example, when a user having logged in and executed a job by pressing a button continues to execute jobs), the buttons are not rearranged. If there is no temporary list stored, the display control unit 410 displays buttons based on a default use order list.

By the foregoing menu screen display processing according to the present exemplary embodiment, a use order list corresponding to the obtained state of the MFP 101 is generated using the use history management table 431, and the buttons on the menu screen are rearranged based on the generated use order list. The MFP 101 determines whether to rearrange the buttons based on whether it is suggested that a user starts operation. In other words, the buttons are rearranged when a user starts to operate the MFP 101. Thus, the buttons on the menu screen are not rearranged each time the job is executed even if a logged-in user executes jobs in succession, thereby preventing interference with the user's operation. While the exemplary embodiment described above deals with an example where the menu screen with buttons in changed display order is displayed when a user starts to operate the MFP 101, the display order of buttons may be changing at timing, such as upon automatic clearing and when the date changes from that of occurrence of a button rearrangement event.

Figure 10:
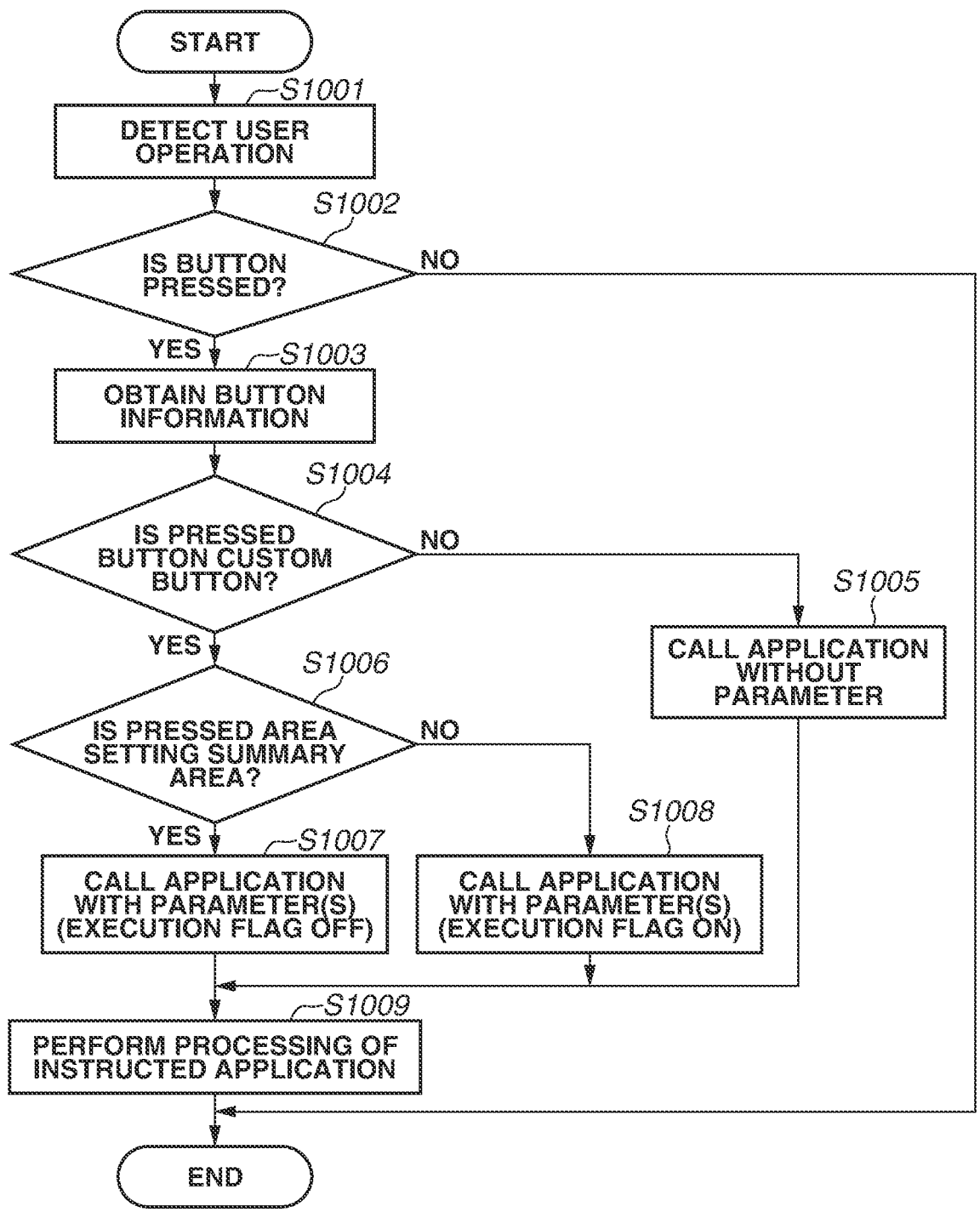
FIG. 10 is a flowchart illustrating application call processing according to the first exemplary embodiment.

FIG. 10 is a flowchart illustrating application call processing according to the present exemplary embodiment. The application call processing is processing for calling an application based on a user operation detected on the menu screen. The flowchart illustrated in FIG. 10 will be described on the assumption that the flowchart of FIG. 9 has been performed to display the menu screen. The flowchart of FIG. 10 corresponds to the processes of steps S807 to S810 in the sequence diagram of FIG. 8.

In step S1001, the display control unit 410 initially detects a user operation performed on the menu screen. In step S1002, the display control unit 410 determines whether the user operation detected in the previous step is a press of a button. If the display control unit 410 determines that the user operation is a press of a button (YES in step S1002), the processing proceeds to step S1003. If the display control unit 410 determines that the user operation is not a press of a button (NO in step S1002), the processing of this flowchart ends. In the following description, the button pressed by the user in step S1001 will be referred to as a "pressed button".

In step S1003, the display control unit 410 uniquely identifies the pressed button from the button ID linked with the pressed button, and obtains the button information about the identified pressed button from the button management table 401 via the button management unit 400. In the following description of FIG. 10, a simple phrase "button information" shall refer to the button information obtained in step S1003.

In step S1004, the display control unit 410 determines whether the pressed button is a custom button. Whether the pressed button is a custom button is determined based on whether the setting value 504 of the button information includes any value. If the display control unit 410 determines that the pressed button is a custom button (YES in step S1004), the processing proceeds to step S1006. If the display control unit 410 determines that the pressed button is not a custom button (NO in step S1004), the display control unit 410 assumes the pressed button to be an application button and the processing proceeds to step S1005.

In step S1005, the display control unit 410 instructs the execution control unit 420 to call the application corresponding to the pressed button. In this case, the display control unit 410 does not provide a parameter for the execution control unit 420. The application to be called is specified in the application to be called 503 of the button information. The processing then proceeds to step S1009.

In step S1006, the display control unit 410 determines whether the area pressed by the user in step S1001 is a setting summary area. If the display control unit 410 determines that the pressed area is a setting summary area (YES in step S1006), the processing proceeds to step S1007. If the display control unit 410 determines that the pressed area is not a setting summary area (NO in step S1006), the processing proceeds to step S1008.

In step S1007, the display control unit 410 instructs the execution control unit 420 to call the application corresponding to the pressed button. The application to be called is specified in the application to be called 503 of the button information. Here, the display control unit 410 provides a parameter or parameters for the execution control unit 420. The parameter(s) is/are specified in the setting value 504 of the button information. The display control unit 410 also instructs the execution control unit 420 to call the application with an execution flag off (display a setting screen instead of executing the job when the application is called). The processing then proceeds to step S1009.

In step S1008, similarly to the processing of step S1007, the display control unit 410 instructs the execution control unit 420 to call the application corresponding to the pressed button. Here, the display control unit 410 provides the parameter(s) for the execution control unit 420. The display control unit 410 also instructs the execution control unit 420 to call the application with the execution flag on (start to execute the job when the application is called). The processing then proceeds to step S1009.

In step S1009, the execution control unit 420 performs the processing of the instructed application. For example, if no parameter is provided, the execution control unit 420 calls the instructed application and displays a setting screen where all the setting values are set to default values. If a parameter or parameters is/are provided and the execution flag is off, the execution control unit 420 calls the instructed application and displays a setting screen where the provided parameter(s) is/are reflected. If a parameter or parameters is/are provided and the execution flag is on, the execution control unit 420 calls the instructed application and starts to execute the job with the provided parameter(s).

By the foregoing application call processing according to the present exemplary embodiment, an application can be called with initial settings, an application can be called with a parameter or parameters to display a setting screen, or an application can be called with a parameter or parameters to immediately execute a job, depending on the user's button operation.

Processing for updating the use history management table according to the present exemplary embodiment will now be described with reference to FIGS. 11A to 12. FIGS. 11A to 11C illustrate examples of the use history management table 431 according to the present exemplary embodiment. FIG. 11A illustrates the use history management table 431 in an initial state. FIG. 11B illustrates the use history management table 431 in a state where jobs have been executed 500 times. FIG. 11C illustrates the use history management table 431 in a state where jobs have been executed 501 times.

Figure 12:
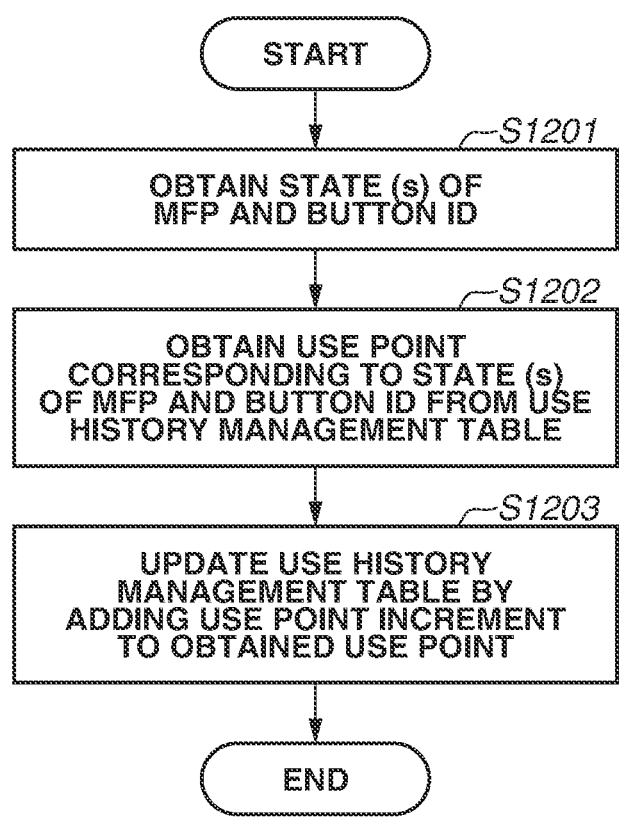
FIG. 12 is a flowchart illustrating processing for updating the use history management table according to the first exemplary embodiment.

FIG. 12 is a flowchart illustrating the processing for updating the use history management table according to the present exemplary embodiment. Suppose that the use history management table 431 before the execution of the flowchart of FIG. 12 is in the state of FIG. 11B. Suppose also that the state (s) of the MFP 101 before the execution of the flowchart of FIG. 12 is where there is a stacked document and no unprinted document (s=S10). In such a case, the menu screen of FIG. 6E is displayed. A case where the button "Send to myself" (button ID=B001) is pressed in such a state will now be specifically described.

When the button is detected to be pressed, in step S1201, the use history management unit 430 obtains the state (s) of the MFP 101 when the button is pressed and the button ID linked with the pressed button. Here, the state where there is a stacked document and no unprinted document is obtained as the state (s) of the MFP 101 (s=S10), and B001 is obtained as the button ID.

In step S1202, the use history management unit 430 obtains the use point corresponding to the state (s) of the MFP 101 and the button ID obtained in step S1201 from the use history management table 431. In this example, the use history management unit 430 obtains "77" by referring to the use point corresponding to the button ID of B001 in the row 1101 of the use history management table 431 illustrated in FIG. 11B.

In step S1203, the use history management unit 430 updates the use history management table 431 by adding a use point increment to the use point obtained in step S1202. The processing of this flowchart then ends. In this example, the use history management unit 430 adds a use point increment of "10" to the use point "77" obtained in step S1202 to obtain "87". The use history management unit 430 then updates the use point corresponding to the button ID of B001 in the row 1101 of the use history management table 431 of FIG. 11B to "87". FIG. 11C illustrates the resulting state of the use history management table 431. In such a case, the use point corresponding to the button ID of B001, "87", exceeds the use point corresponding to the button ID of B002, "86". However, the display order of the buttons displayed on the menu screen is not changed at this point in time. If the user logs out from the MFP 101 in such a state and then logs in on the MFP 101 and starts operation next time, the menu screen to be displayed is switched from the menu screen of FIG. 6E to the menu screen of FIG. 6F. In other words, the custom button 511 linked with the button ID=B001 and the custom button 512 linked with the button ID=B002 are switched in position. By contrast, if the user logged in when the use point corresponding to the button ID of B001 becomes greater continues to execute jobs without logging out, the display order of the buttons displayed on the menu screen remains unchanged. In other words, the menu screen of FIG. 6E remains displayed. This can prevent the user who remains logged in and executes jobs from getting confused because the buttons are rearranged each time a job is executed.

By the processing for updating the use history management table as described above, the use point increment is added to a use point corresponding to the state of the MFP 101 each time a button on the menu screen is operated. This increases the use points of frequently used buttons, and the frequently used buttons are displayed by priority.

The information processing system according to the first exemplary embodiment described above manages the use frequencies of the buttons on the menu screen in each state of the MFP 101, and rearranges the buttons based on the use frequencies corresponding to the state of the MFP 101 in displaying the menu screen. Buttons likely to be used by the user are thereby displayed at readily visible positions. In other words, the user's operability in selecting an intended button can be improved.

The foregoing first exemplary embodiment has dealt with the processing for controlling the display order of the buttons based on the use points. In a second exemplary embodiment, processing for correcting the display order in a case where an MFP 101 is in a specific state will be described. For example, if the state (s) of the MFP 101 is where there is no stacked document but an unprinted document (S01), the user is likely to want to perform printing on the MFP 101. In such a case, the MFP 101 then corrects the use order list such that the buttons for calling the print application 422 (the buttons defined by the button information 516 and 517 of FIG. 5 where the application to be called 503 includes "print application 422") have a high priority. A description of portions of the configuration of an information processing system according to the second exemplary embodiment that are similar to those described in the first exemplary embodiment will be omitted.

Figure 13:
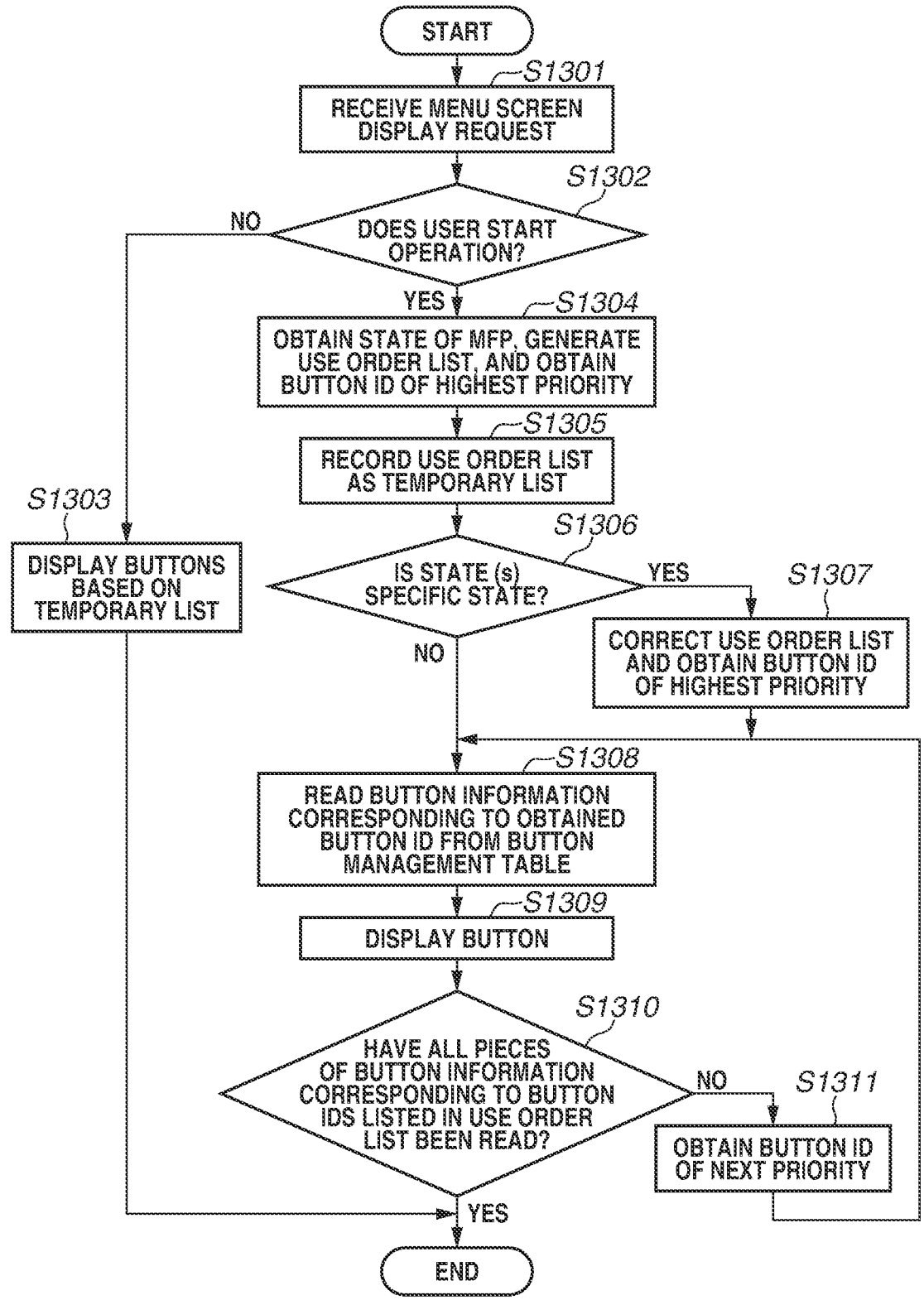
FIG. 13 is a flowchart illustrating menu screen display processing according to a second exemplary embodiment.

Menu screen display processing according to the present exemplary embodiment will now be described with reference to FIGS. 13 to 15. FIG. 13 is a flowchart illustrating the menu screen display processing according to the present exemplary embodiment. A description will be given on the assumption that the use history management table 431 before the execution of the flowchart of FIG. 13 is in the state of FIG. 14. Steps S1301 to S1305 in the flowchart of FIG. 13 are similar to steps S901 to S905 in the flowchart of FIG. 9. Steps S1308 to S1311 in the flowchart of FIG. 13 are similar to steps S906 to S909 in the flowchart of FIG. 9. The processing of steps S1306 and S1307 will therefore be mainly described.

The following description will be given on the assumption that the state (s) of the MFP 101 obtained in step S1304 is where there is no stacked document but an unprinted document (S01). In such a case, the display control unit 410 generates a use order list by referring to the use points in a row 1401 of the use history management table 431 illustrated in FIG. 14. Specifically:

Use order list={B002,B001,B006,B007,B005,B003, B004}.

In step S1306, the display control unit 410 determines whether the state (s) of the MFP 101 is a specific state. Here, the display control unit 410 determines whether the state (s) is where there is no stacked document but an unprinted document (S01). If the state (s) is determined to be the specific state (YES in step S1306), the processing proceeds to step S1307. If the state (s) is determined to not be the specific state (NO in step S1306), the processing proceeds to step S1308, which is similar to step S906.

In step S1307, the display control unit 410 corrects the use order list such that a predetermined button or buttons (buttons defined by the button information 516 and 517 illustrated in FIG. 5 where the application to be called 503 includes "print application 422") has/have a high priority. Specifically, the button ID "B006" of the button information 516 and the button ID "B007" of the button information 517 are moved to the top of the use order list, whereby the use order list is corrected as follows:

Use order list={B006,B007,B002,B001,B005,B003, B004}

The display control unit 410 then obtains the button ID of the highest priority from the corrected use order list. The processing then proceeds to step S1308, which is similar to step S906.

FIG. 15 illustrates a menu screen displayed when the use order list is generated with reference to the use points in the row 1401 of the use history management table of FIG. 14 by the foregoing menu screen display processing. In the menu screen of FIG. 15, the buttons "Print all" (button ID=B006) and "Print" (button ID=B007) are displayed at readily visible positions.

The information processing system according to the second exemplary embodiment described above rearranges the buttons to give a predetermined button or buttons high priority if the state of the MFP 101 in displaying the menu screen is a specific state. Buttons likely to be used by the user are thereby displayed at readily visible positions. In other words, the user's operability in selecting an intended button can be improved.

The foregoing second exemplary embodiment has dealt with the processing for correcting the display order when the MFP 101 is in a specific state. In a third exemplary embodiment, processing for correcting the display order of a specific button will be described. Suppose, for example, that a user registers a button for giving an instruction for an operation "store an estimate report". The button, although registered for use, has a low use point and is thus not always displayed at a readily visible position. An MFP 101 therefore corrects the use points in the use history management table 431 such that such a button comes to the top of the use order list. A description of portions of the configuration of an information processing system according to the third exemplary embodiment that are similar to those described in the first exemplary embodiment will be omitted.

Figure 16:
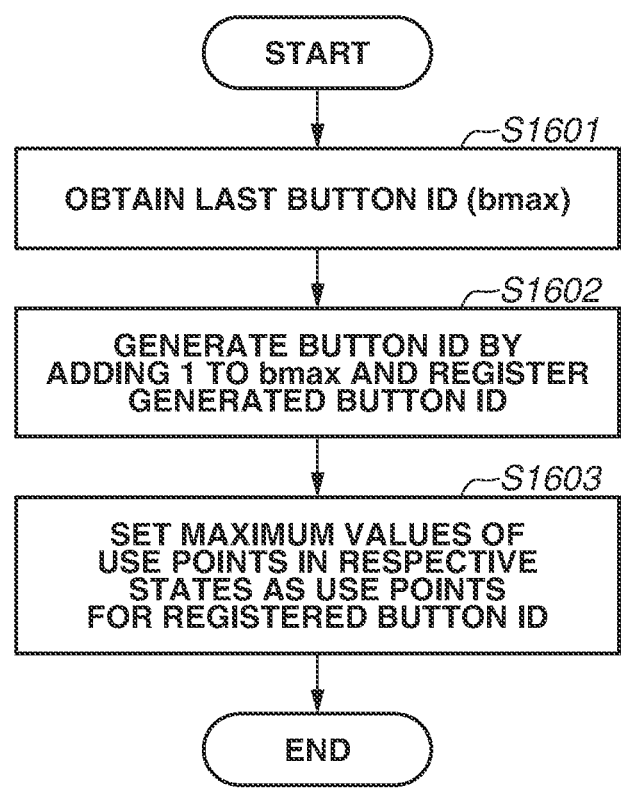
FIG. 16 is a flowchart illustrating button registration processing according to a third exemplary embodiment.

Button registration processing according to the present exemplary embodiment will now be described with reference to FIGS. 16 to 19. FIG. 16 is a flowchart illustrating the button registration processing according to the present exemplary embodiment. Suppose that the button management table 401 before the execution of the flowchart illustrated in FIG. 16 is in the state of FIG. 5. Suppose also that the use history management table 431 before the execution of the flowchart illustrated in FIG. 16 is in the state of FIG. 14. The flowchart of FIG. 16 starts when the user gives an instruction to register a button. The following description deals with a case where an instruction to register the button for giving an instruction for the operation "store an estimate report".

In step S1601, the button management unit 400 initially obtains the last button ID (bmax) "B007" from the button management table 401 illustrated in FIG. 5.

In step S1602, the button management unit 400 generates a button ID "B008" by adding 1 to the button ID obtained in step S1601. The button management unit 400 registers information instructed by the user as button information with the generated button ID "B008". FIG. 17 illustrates the button management table 401 where button information 518 with the button ID "B008" is added next to the button information 517 with the button ID "B007" illustrated in FIG. 5.

In step S1603, the use history management unit 430 registers the button ID "B008" registered in step S1602 into the use history management table 431 of FIG. 14, and sets the maximum values of the use points in the respective states as use points. The processing of this flowchart then ends.

FIG. 18 illustrates the use history management table 431 where the use points for the button ID "B008" are set. If the state (s) is "S00", the maximum use point is that for the button ID "B005", i.e., "263", which is set as the use point for the button ID "B008". Similarly, if the state (s) is "S01", the maximum use point is that for the button ID "B002", i.e., "2534", which is set as the use point for the button ID "B008". If the state (s) is "S10", the maximum use point is that for the button ID "B001", i.e., "87", which is set as the use point for the button ID "B008". If the state (s) is "S11", the maximum use point is that for the button ID "B002", i.e., "404", which is set as the use point for the button ID "B008".

By such button registration processing, a new button is registered in the button management table 401 and the use history management table 431. In this case, the maximum values of the use points in the respective states in the use history management table 431 are set as the use points for the new button. If the menu screen display processing illustrated by the flowchart of FIG. 9 is performed, a use order list is thus generated with the new button at the top in priority. A specific description will be given on the assumption that, in step S901 of FIG. 9, the display control unit 410 obtains a state where there is a stacked document and no unprinted document as the state (s) of the MFP 101 (s=S10). In such a case, the display control unit 410 generates the use order list by referring to the use points in a row 1801 of the use history management table 431 illustrated in FIG. 18. Specifically:

Use order list={B008,B001,B002,B005,B003,B004, B006,B007}.

Figure 19:
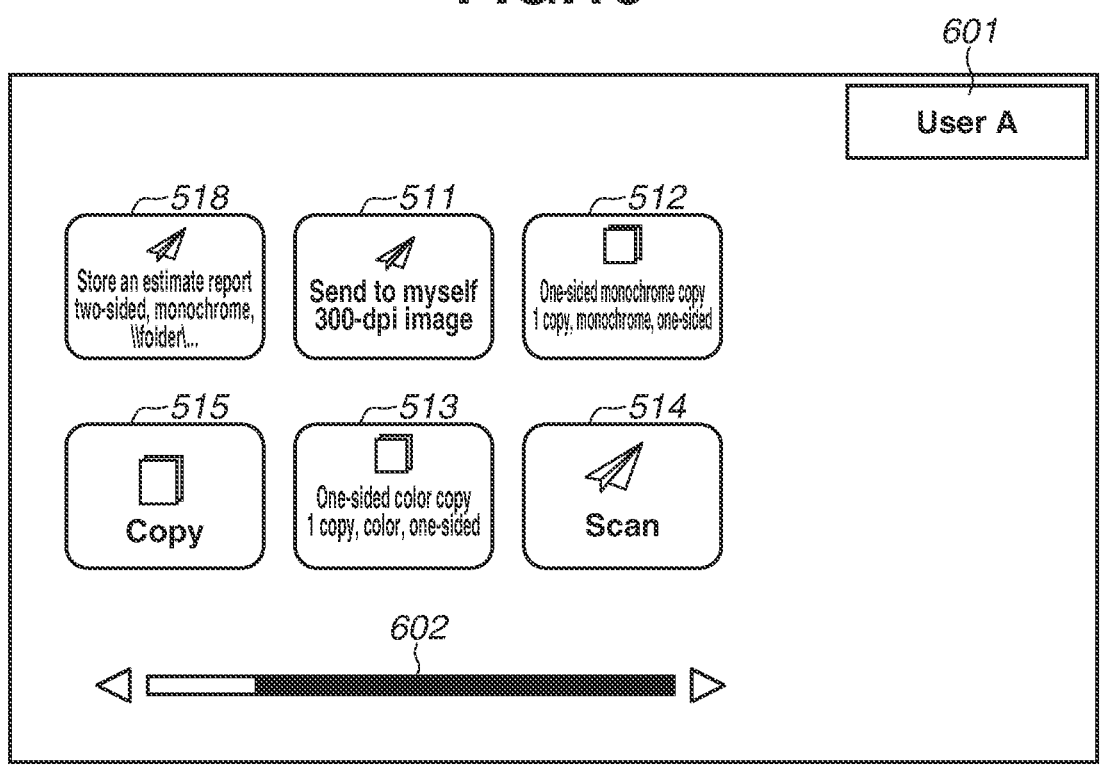
FIG. 19 is a diagram illustrating an example of a menu screen.

FIG. 19 illustrates a menu screen displayed when the use order list is generated by referring to the use points in the row 1801 of the use history management table 431 of FIG. 18 as described above. The menu screen of FIG. 19 displays the button "Store an estimate report" (button ID=B008) at the most visible position.

The information processing system according to the third exemplary embodiment described above corrects the use points of a specific button, such as a user-registered button, to be greater than or equal to those of the other buttons. This increases the priority of the specific button highly likely to be used by the user, and the button is displayed at a readily visible position. The user's operability in selecting an intended button can thus be improved.

In the foregoing first exemplary embodiment, the processing for updating the use history management table 431 by using the flowchart of FIG. 12 is described. In a fourth exemplary embodiment, processing for correcting the use points is performed after the use history management table 431 is updated. An MFP 101 corrects the use points in the use history management table 431 to reduce the effect of use points added in the past. A description of portions of the configuration of an information processing system according to the fourth exemplary embodiment that are similar to those described in the first exemplary embodiment will be omitted.

Figure 20:
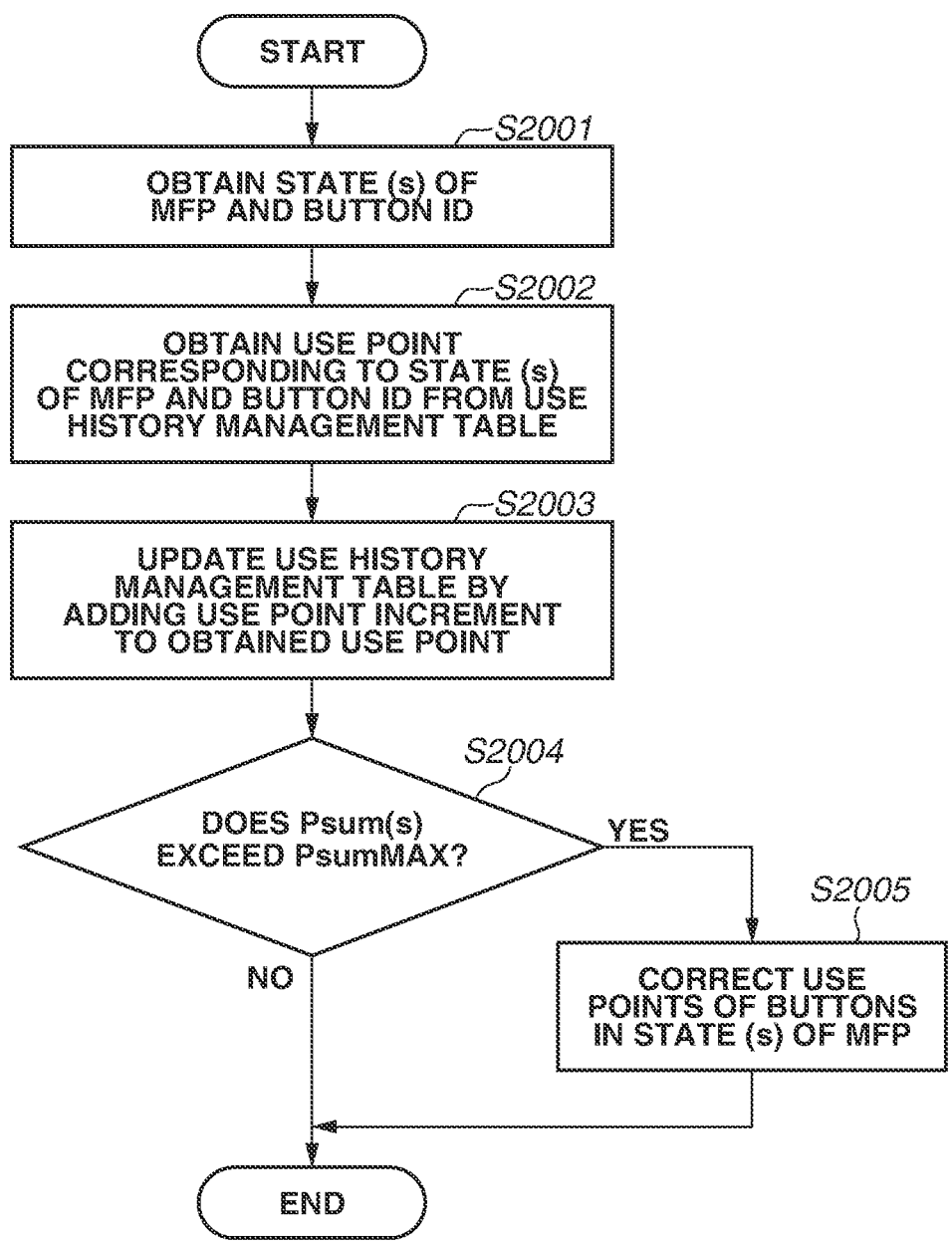
FIG. 20 is a flowchart illustrating menu screen display processing according to a fourth exemplary embodiment.
Figure 22:
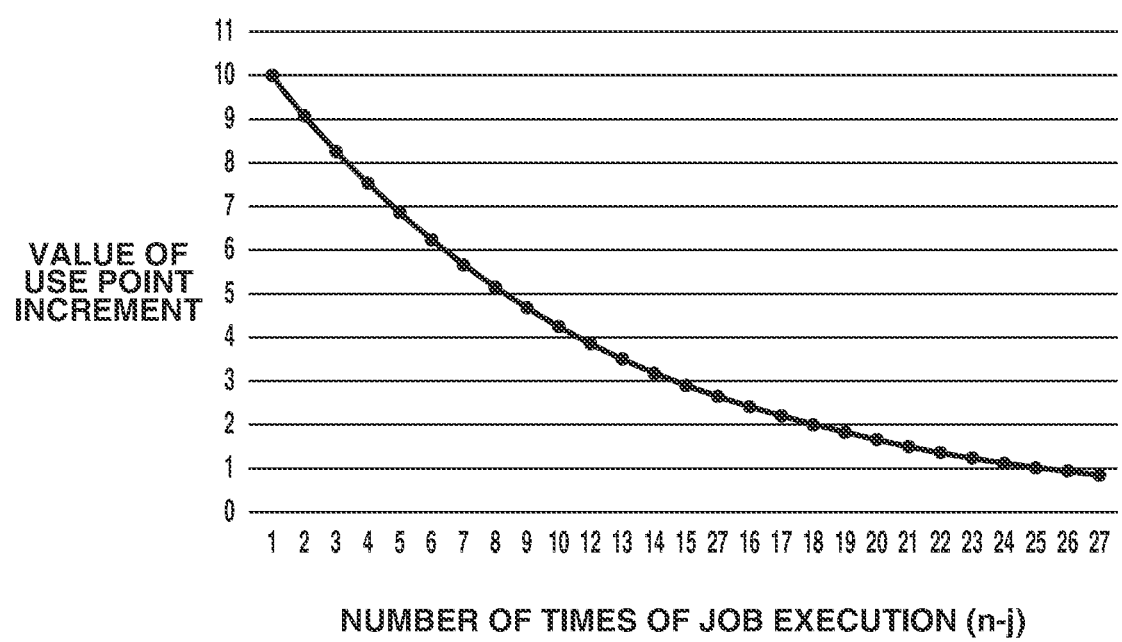
FIG. 22 is a graph illustrating the value of a use point increment vs. the number of times of job execution.

Processing for updating the use history management table according to the present exemplary embodiment will now be described with reference to FIGS. 20 to 22. FIG. 20 is a flowchart illustrating the processing for updating the use history management table according to the present exemplary embodiment. FIGS. 21A to 21D illustrate examples of the use history management table 431 used in the present exemplary embodiment. Steps S2001 to S2003 in the flowchart of FIG. 20 are similar to steps S1201 to S1203 in the flowchart of FIG. 12. The processing of steps S2004 and S2005 in FIG. 20 will mainly be described below.

In the present exemplary embodiment, corrections are made such that the total sum (hereinafter, denoted as Psum(s)) of the use points in each state (s) in the use history management table 431 does not exceed a predetermined threshold (hereinafter, denoted as PsumMAX). Suppose that the use history management table 431 before the execution of the flowchart of FIG. 20 is in the state of FIG. 21B. Suppose also that the state (s) of the MFP 101 before the execution of the flowchart of FIG. 20 is where there is a stacked document and no unprinted document (s=S10). A case where the button 511 "Send to myself" (button ID=B001) is pressed in such a state will specifically be described.

In step S2001, the use history management unit 430 obtains the state where there is a stacked document and no unprinted document (s=S10) as the state (s) of the MFP 101, and obtains B001 as the button ID.

In step S2002, the use history management unit 430 obtains "35" by referring to the use point for the button ID of B001 in a row 2101 of the use history management table 431 of FIG. 21B.

In step S2003, the use history management unit 430 adds a use point increment of "10" to "35" obtained in step S2002, and obtains "45". The use history management unit 430 then updates the use point for the button ID of B001 in the row 2101 of the use history management table 431 of FIG. 21B to "45". FIG. 21C illustrates the resulting state of the use history management table 431.

In step S2004, the use history management unit 430 calculates the total sum Psum(s) of the use points of the buttons in the state (s) of the MFP 101 obtained in step S2001, based on the use history management table 431 updated in step S2003. The use history management unit 430 then compares the calculated Psum(s) with PsumMAX, and determines whether Psum(s) exceeds PsumMAX. Here, the use history management unit 430 determines whether the total sum Psum(S10) of the use points of the buttons in the state where there is a stacked document and no unprinted document (s=S10) exceeds PsumMAX (=100). If Psum (S10) is determined to exceed PsumMAX (YES in step S2004), the processing proceeds to step S2005. If Psum (S10) is determined to not exceed PsumMAX (NO in step S2004), the processing of this flowchart ends without the use history management unit 430 making corrections. In this case, Psum(S10) is "106" and is thus determined to be greater than PsumMAX (=100). The processing then proceeds to step S2005.

In step S2005, the use history management unit 430 corrects the use points of the respective buttons in the state (s) of the MFP 101 in the use history management table 431. Here, the use point of each button in the state where there is a stacked document and no unprinted document (s=S10) is corrected by using the following equation (1):

$$p(S10, b) = \left[ \frac{p(S10, b) \times PsumMAX}{Psum(S10)} \right], \quad (1)$$

where [ ] represents an integral part. P(S10, b) is the use point of each button (button ID=b) when the MFP 101 is in the state (s) where there is a stacked document and no unprinted document (s=S10).

For example, if the button ID is "B001", the use point after the correction using equation (1) is given by:

$p(S10,B001)=[45\times100/106]=[42.452\ldots]=42.$

Similarly, if the button ID is "B002", the use point after the correction using equation (1) is given by:

$p(S10,B002)=[39\times100/106]=[36.792\ldots]=36,$ where, referring to a row 2102 of the use history management table 431 of FIG. 21C for the use point for the button ID "B002", the uncorrected use point for the button ID "B002" is "39".

FIG. 21D illustrates the use history management table 431 where the use points of the respective buttons have been corrected as described above. The total sum Psum(S10) of the use points in FIG. 21D is "97", i.e., less than or equal to PsumMAX (=100). In such a case, since the use point "42" for the button ID of B001 is greater than the use point "36" for the button ID of B002, the menu screen to be displayed when the MFP 101 starts to be operated is switched from the menu screen of FIG. 6E to the menu screen of FIG. 6F. More specifically, the custom button 511 linked with the button ID=B001 and the custom button 512 linked with the button ID=B002 are switched in position.

As described above, correcting the use points such that the total sum of the use points in each state (s) in the use history management table 431 does not exceed the predetermined threshold can thus reduce the effect of the use points added in the past. For example, the use point for the state of the MFP 101 "s", the button ID "b", and the number of times of job execution "j" will be denoted as p(s, b, j). The total sum of the use points for the state of the MFP 101 "s" and the number of jobs executed "j" will be denoted as Psum(s, j). In such a case, the relationship therebetween is expressed by the following equation (2):

$Psum(s,j)=\Sigma_b^\infty p(s,b,j).$  (2)

The total sum Psum(s, j+1) of the use points in the obtained state (s) is given by Psum(s, j)+A, where A is the use point increment. Using equation (1), the use point p(s, b, j+1) of each button is expressed by the following equation (3):

$$p(s, b, j+1) = p(s, b, j) \times \frac{PsumMAX}{(Psum(s, j) + A)}. \quad (3)$$

Since the use history management unit 430 makes the foregoing corrections only if Psum(s, j)+A is greater than PsumMAX in the processing of step S2004, there holds an inequality expressed by the following inequality expression (4):

$$1 > \frac{PsumMAX}{(Psum(s, j) + A)}. \quad (4)$$

The value of a use point of 1 in p(s, b, j) will be denoted as O(j), where j is the number of times of job execution. From inequality expression (4), O(j+1) in p(s, b, j+1) is less than 1 due to the multiplication by PsumMAX/{Psum(s, j)+A}.

For the sake of simplicity, consider the case where Psum (s, j) is always PsumMAX. The value of a use point of 1 at the number of times of job execution "j" when the number of times of job execution has changed to n will be denoted as O(n, j). O(n, j) is expressed by the following equation (5):

$$O(n, j) = 1 \times \left\{ \frac{PsumMAX}{(PmusMAX + A)} \right\}^{(n-j)}. \quad (5)$$

In other words, O(n, j) attenuates as the number of times of job execution increases. Assuming that the use point increment A is 10, and PsumMAX is 100, there holds the following equation (6):

$$\frac{PsumMAX}{(PsumMAX + A)} = \frac{100}{(100 + 10)} \approx 0.91. \quad (6)$$

This is equivalent to multiplying the use point of each button before job execution by 0.91. As illustrated in FIG. 22, the value of the use point increment A attenuates from 10 along with job execution. If the job is repeated 26 times, the value becomes "0.923", which is less than 1. The use point increment A thus has substantially no impact after rounded off.

The information processing system according to the fourth exemplary embodiment described above thus makes corrections to maintain the total sum of the use points constant. This reduces the effect of past use points. Buttons highly likely to be used by the user are therefore displayed at readily visible positions based on the user's latest usage. In other words, the user's operability in selecting an intended button can be improved.

In the foregoing first exemplary embodiment, the processing for updating the use history management table 431 by using the flowchart of FIG. 12 is described. In a fifth exemplary embodiment, the use history management table is updated by adding the use point increment to the use point of a pressed button, after the use points of the buttons in the use history management table 431 are corrected. Like the fourth exemplary embodiment, an MFP 101 corrects the use points in the use history management table 431 to reduce the effect of use pointes added in the past. A description of portions of the configuration of an information processing system according to the fifth exemplary embodiment that are similar to those described in the first exemplary embodiment will be omitted.

Figure 23:
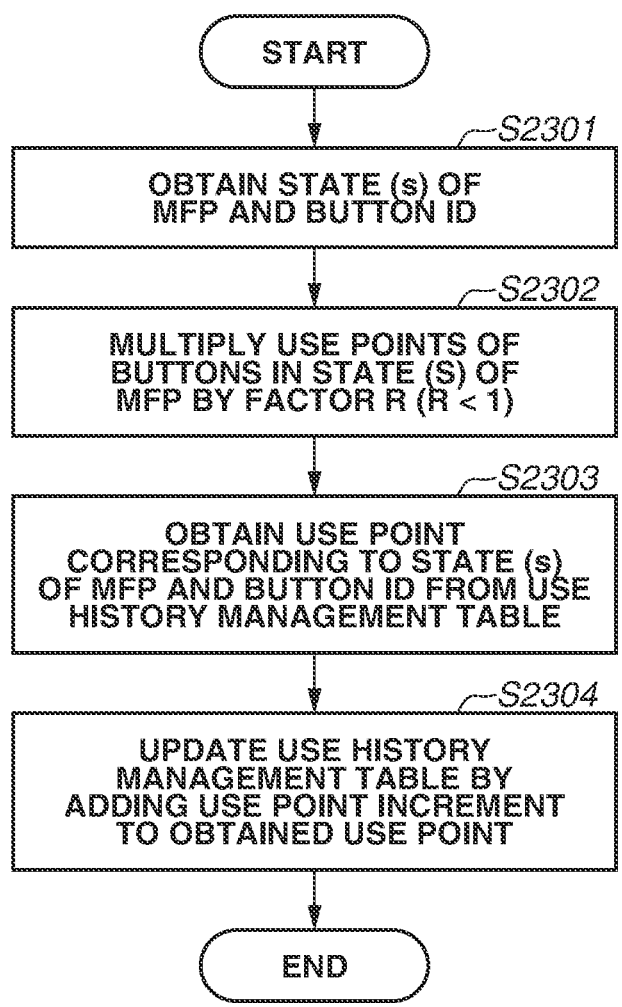
FIG. 23 is a flowchart illustrating menu screen display processing according to a fifth exemplary embodiment.

The processing for updating the use history management table according to the present exemplary embodiment will now be described with reference to FIGS. 23 to 24B. FIG. 23 is a flowchart illustrating the processing for updating the use history management table according to the present exemplary embodiment. FIGS. 24A and 24B illustrate examples of the use history management table 431 used in the present exemplary embodiment. Steps S2301, S2303, and S2304 in the flowchart of FIG. 23 are similar to steps S1201 to S1203 in the flowchart of FIG. 12. The processing of step S2302 in FIG. 23 will mainly be described below.

Suppose that the state (s) of the MFP 101 before the execution of the flowchart of FIG. 23 is where there is a stacked document and no unprinted document (s=S10). A case where the button 511 "Send to myself" (button ID=B001) is pressed in such a state will specifically be described.

In step S2301, the use history management unit 430 obtains the state where there is a stacked document and no unprinted document (s=S10) as the state (s) of the MFP 101, and the use history management unit 430 obtains B001 as the button ID.

In step S2302, the use history management unit 430 obtains the use points of the buttons in the state (s) of the MFP 101 obtained in step S2301 from the use history management table 431. The use history management unit 430 then corrects the obtained use points of the buttons by multiplying the use points by a predetermined factor R, using the following equation (7):

$$p(s,b,j+1)=p(s,b,j) \times R (R<1), \quad (7)$$

where p(s, b, j) is the use point for the case where the state of the MFP 101 is s, the button ID is b, and the number of times of job execution is j. FIG. 24A illustrates a state where the use points of the buttons in the use history management table 431 are corrected by using the foregoing equation (7).

In step S2303, the use history management unit 430 obtains the use point corresponding to the state (s) of the MFP 101 and the button ID obtained in step S2301 from the corrected use history management table 431. The use history management unit 430 obtains "38" by referring to the use point for the button ID of B001 in a row 2401 of the use history management table 431 illustrated in FIG. 24A.

In step S2304, the use history management unit 430 updates the use history management table 431 by adding the use point increment to the use point obtained in step S2303. The processing of this flowchart then ends. The use history management unit 430 adds a use point increment of "10" to the use point "38" obtained in step S2303, and obtains "48". The use history management unit 430 then updates the use point for the button ID of B001 in the row 2401 of the use history management table 431 illustrated in FIG. 24A to "48". FIG. 24B illustrates the resulting state of the use history management table 431. Since the use point for the button ID of B001, "48", is greater than the use point for the button ID of B002, "32", the menu screen to be displayed when the MFP 101 starts to be operated is switched from the menu screen of FIG. 6E to the menu screen of FIG. 6F. In other words, the custom button 511 linked with the button ID=B001 and the custom button 512 linked with the button ID=B002 are switched in position.

As described above, correcting the use points of the buttons by multiplication by a predetermined factor R can reduce the effect of use points added in the past.

For example, suppose that p(S, B, J) represents the use point for a button ID (B) corresponding to a job never having been executed in the state (S) of the MFP 101 when the number of times of job execution is J. In such a case, p(S, B, J) is expressed by the following equation (8):

$$p(S,B,J)=p(S,B,0) \times R^J (R<1). \quad (8)$$

The value of a use point of 1 at the number of times of job execution "j" when the number of times of job execution has changed to "n" will be denoted as O(n, j). O(n, j) is expressed by the following equation (9):

$$O(n,j)=1 \times R^{(n-j)} (R<1). \quad (9)$$

In other words, O(n, j) attenuates as the number of times of job execution increases. Suppose that R is 0.91 as calculated in the fourth exemplary embodiment, and the use point increment A is 10. As illustrated in FIG. 22, the value of the use point increment A attenuates from 10 along with job execution. If the job is repeated 26 times, the value becomes "0.923", which is less than 1. The use point increment A thus has substantially no impact after rounded off.

As described above, the information processing system according to the fifth exemplary embodiment corrects the use points of the buttons by multiplying the use points by a factor less than 1. This reduces the effect of past use points. Buttons highly likely to be used by the user are therefore displayed at readily visible positions based on the user's latest usage. In other words, the user's operability in selecting an intended button can be improved.

In the foregoing first exemplary embodiment, the display order of the buttons is controlled based on the use points. In a sixth exemplary embodiment, the display order of the buttons is only controlled if there are buttons to be rearranged across pages. For example, similarly to the first exemplary embodiment, a difference between the use points of the buttons "Send to myself" (button ID=B001) and "One-sided monochrome copy" (button ID=B002) is less than the use point increment. In such a case, if the two buttons are alternately used, the positions of the two buttons can thus be switched each time. An MFP 101 according to the present exemplary embodiment then stores the use order list before the addition of the use point increment, compares the use order list with the one after the addition of the use point increment, and performs processing for updating the use order list only when buttons to be rearranged are across pages. A description of portions of the configuration of an information processing system according to the sixth exemplary embodiment that are similar to those described in the first exemplary embodiment will be omitted.

Menu screen display processing according to the present exemplary embodiment will now be described with reference to FIGS. 25 to 27. FIG. 25 is a flowchart illustrating the menu screen display processing according to the present exemplary embodiment. Steps S2501 to S2505 in the flowchart of FIG. 25 are similar to steps S901 to S905 in the flowchart of FIG. 9. Steps S2508 to S2511 in the flowchart of FIG. 25 are similar to steps S906 to S909 in the flowchart of FIG. 9. Steps S2506 and S2507 will thus be mainly described.

The following description will be given on the assumption that the use history management table 431 before the execution of the flowchart of FIG. 25 is in the state of FIG. 11C.

In the following description, the state (s) of the MFP 101 obtained in step S2504 is assumed to be a state where there is a stacked document and no unprinted document (s=S10). The display control unit 410 generates a use order list by referring to the use points in the row 1102 of the use history management table 431 illustrated in FIG. 11C. Specifically:

Use order list={[$B$001,$B$002,$B$005,$B$003,$B$004,$B$006],
  [$B$007]}, where [ ] represents a page group in the use order list. A page group includes the button IDs of buttons to be displayed on the same page. In this description, the button IDs are grouped in sixes since six buttons are displayed on one page.

In step S2506, the display control unit 410 compares a use order list for the state where there is a stacked document and no unprinted document (S10), overwritten last time in step S2507 described below, with the use order list generated in step S2504. Based on the result of the comparison, the display control unit 410 determines whether a predetermined condition is satisfied. In this case, the display control unit 410 determines whether there is a difference across pages between the two use order lists. If there is determined to be no difference across pages (NO in step S2506), the processing proceeds to step S2508, which is similar to step S906. If there is determined to be a difference across pages (YES in step S2506), the processing proceeds to step S2507.

An initial use order list to be overwritten in step S2507 is one generated by the display control unit 410 from the use history management table 431 in an initial state. For example, the following use order list is generated and stored by referring to the use points in a row 1103 of the use history management table 431 illustrated in FIG. 11A:

Use order list={[$B$001,$B$002,$B$003,$B$004,$B$005,$B$006],
  [$B$007]}.

Suppose that the following use order list has been generated and stored with reference to the use points in the row 1101 of the use history management table 431 illustrated in FIG. 11B by the previous execution of the processing of the flowchart of FIG. 25:

Use order list={[$B$002,$B$001,$B$005,$B$003,$B$004,$B$006],
  [$B$007]}.

The display control unit 410 determines that the difference between the use order list generated in step S2504 and the stored use order list is an interchange of B001 and B002, not a change across pages. In such a case, the processing proceeds to step S2508, which is similar to step S906.

If the display control unit 410 determines by using the foregoing menu screen display processing that there are only buttons to be rearranged within the same page, the same menu screen as the one (FIG. 6E) displayed in executing the previous job is displayed as illustrated in FIG. 26A. In other words, the buttons are not rearranged.

Another example will now be described on the assumption that the use history management table 431 before the execution of the flowchart of FIG. 25 is in the state of FIG. 27.

In the following description, the state (s) of the MFP 101 is assumed to be a state where there is a stacked document and no unprinted document (s=S10). The display control unit 410 generates a use order list by referring to the use points in a row 2701 of the use history management table 431 illustrated in FIG. 27. Specifically:

Use order list={[$B$001,$B$002,$B$005,$B$003,$B$004,$B$007],
  [$B$006]}.

In step S2506, the display control unit 410 compares the use order list for the state where there is a stacked document and no unprinted document (s=S10), overwritten last time in step S2507 described below, with the use order list generated in step S2504. Based on the result of the comparison, the display control unit 410 determines whether there is a difference across pages between the two use order lists.

Suppose that the following use order list has been stored with reference to the use points in the row 1101 of the use history management table 431 of FIG. 11B by the previous execution of the processing of the flowchart illustrated in FIG. 25:

Use order list={[$B$002,$B$001,$B$005,$B$003,$B$004,$B$006],
  [$B$007]}.

The display control unit 410 determines that the difference between the use order list generated in step S2504 and the stored use order list includes an interchange of B001 and B002 and an interchange of B006 and B007, i.e., there is a change across pages. In such a case, the processing proceeds to step S2507.

In step S2507, the display control unit 410 overwrites the stored use order list with the use order list generated in step S2504 as follows:

Not-overwritten use order list={[$B$002,$B$001,$B$005,
  $B$003,$B$004,$B$006],[$B$007]}, and Overwritten use order list={[$B$001,$B$002,$B$005,$B$003,
  $B$004,$B$007],[$B$006]}.

The display control unit 410 obtains the button ID of the highest priority in the overwritten use order list. The processing then proceeds to step S2508, which is similar to step S906.

If the display control unit 410 determines by using the foregoing menu screen display processing that there are buttons to be rearranged across pages, a menu screen different from the one (FIG. 6E) displayed in executing the previous job is displayed as illustrated in FIG. 26B. In other words, the buttons are switched in position.

The information processing system according to the sixth exemplary embodiment described above does not rearrange the buttons if there are only buttons to be rearranged within the same page in displaying the menu screen. This suppresses frequent rearrangement of the display positions of the buttons to not interfere with the user's smooth operations. In other words, the user's operability in selecting an intended button can be improved.

While the present disclosure includes exemplary embodiments, the foregoing exemplary embodiments are merely practical examples, and the technical scope of the present disclosure should not be restrictively interpreted based on the exemplary embodiments. That is, exemplary embodiments of the present disclosure can be implemented in various forms without departing from the technical concept and essential features thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-119953, filed Jul. 13, 2020, which is hereby incorporated by reference herein in its entirety.

What is claimed is:

1. An information processing apparatus comprising:
at least one memory device that stores a set of instructions; and
at least one processor that executes the set of instructions to:
store a list that specifies a display order of a plurality of display objects for instructing execution of processing;
acquire a request for screen display;
in a case where a user does not start an operation at a timing of acquiring the request for screen display, based on the display order specified in the stored list, display a first screen on which the plurality of display objects are arranged; and
in a case where the user starts an operation at the timing of acquiring the request for screen display, delete the stored list, and, based on a history of processing corresponding to the plurality of display objects, generate a list that specifies a display order of the plurality of display objects anew, and, based on the display order specified in the list generated anew, display a second screen on which the plurality of display objects are arranged.

2. The information processing apparatus according to claim 1, wherein the display order of the plurality of display objects is changed if the information processing apparatus is in a state where a start of an operation by a user is detected.

3. The information processing apparatus according to claim 1, wherein the display order of the plurality of display objects is changed if the information processing apparatus performs user login processing.

4. The information processing apparatus according to claim 1, wherein the display order of the plurality of display objects is changed if the information processing apparatus detects presence of a user in front of the information processing apparatus.

5. The information processing apparatus according to claim 1, wherein the display order of the plurality of display objects is changed if the information processing apparatus detects that an operation unit of the information processing apparatus is operated by a user.

6. The information processing apparatus according to claim 1, wherein the display order of the plurality of display objects is not changed, in a case where the display order of the plurality of display objects is determined to not be changed based on the state of the information processing apparatus.

7. The information processing apparatus according to claim 1, wherein the display order of the plurality of display objects is not changed, in a case where a user logged in the information processing apparatus continuously executes jobs.

8. The information processing apparatus according to claim 1, wherein the at least one processor executes the set of instructions to:
determine whether to change the display order of the plurality of display objects based on a state of the information processing apparatus.

9. The information processing apparatus according to claim 1, wherein the display order of the plurality of display objects is changed such that a frequently used button is located in front.

10. The information processing apparatus according to claim 1, wherein the display order of the plurality of display objects is changed based on numbers of uses of the respective plurality of display objects in each state of the information processing apparatus.

11. The information processing apparatus according to claim 1, wherein the information processing apparatus is an image processing apparatus including at least either a print function or a scan function.

12. A method for an information processing apparatus, the method comprising:
storing a list that specifies a display order of a plurality of display objects for instructing execution of processing;
acquiring a request for screen display;
in a case where a user does not start an operation at a timing of acquiring the request for screen display, based on the display order specified in the stored list, displaying a first screen on which the plurality of display objects are arranged; and
in a case where the user starts an operation at the timing of acquiring the request for screen display, deleting the stored list, and, based on a history of processing corresponding to the plurality of display objects, generating a list that specifies a display order of the plurality of display objects anew, and, based on the display order specified in the list generated anew, displaying a second screen on which the plurality of display objects are arranged.

13. A non-transitory computer-readable storage medium storing a program to cause a computer to perform a method for an information processing apparatus, the method comprising:

storing a list that specifies a display order of a plurality of display objects for instructing execution of processing;

acquiring a request for screen display;

in a case where a user does not start an operation at a timing of acquiring the request for screen display, based on the display order specified in the stored list, displaying a first screen on which the plurality of display objects are arranged; and in a case where the user starts an operation at the timing of acquiring the request for screen display, deleting the stored list, and, based on a history of processing corresponding to the plurality of display objects, generating a list that specifies a display order of the plurality of display objects anew, and, based on the display order specified in the list generated anew, displaying a second screen on which the plurality of display objects are arranged.

* * * * *